US012634020B2

(12) United States Patent
Gomez Martinez et al.

(10) Patent No.: US 12,634,020 B2
(45) Date of Patent: May 19, 2026

(54) OPTICALLY-ASSISTED CALIBRATION

(71) Applicant: QUALCOMM Incorporated, San Diego, CA (US)

(72) Inventors: Feliciano Gomez Martinez, Los Gatos, CA (US); Xiaoxin Zhang, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 177 days.

(21) Appl. No.: 18/676,227

(22) Filed: May 28, 2024

(65) Prior Publication Data

US 2025/0373347 A1    Dec. 4, 2025

(51) Int. Cl.
| | |
|---|---|
| *H04B 3/46* | (2015.01) |
| *H04B 17/11* | (2015.01) |
| *H04B 17/20* | (2015.01) |
| *H04B 17/21* | (2015.01) |

(52) U.S. Cl.
CPC ........... *H04B 17/253* (2023.05); *H04B 17/11* (2015.01); *H04B 17/21* (2015.01)

(58) Field of Classification Search
CPC ....... H04B 17/253; H04B 17/11; H04B 17/21

USPC ................................. 375/224, 219, 295, 316
See application file for complete search history.

(56) References Cited

U.S. PATENT DOCUMENTS

| | | | | |
|---|---|---|---|---|
| 8,055,205 B2 * | 11/2011 | Wurm | ..................... | H04B 17/14 |
| | | | | 455/67.11 |
| 2016/0380711 A1 * | 12/2016 | Feigin | ....................... | H04B 1/40 |
| | | | | 342/174 |

* cited by examiner

*Primary Examiner* — Zewdu A Kassa
(74) *Attorney, Agent, or Firm* — Procopio, Cory, Hargreaves & Savitch LLP

(57)        ABSTRACT

Aspects presented herein may enable a UE to calibrate its radio frequency (RF) sensor(s) using an optical sensor or a calibrated RF sensor. In one aspect, a first UE estimates a first distance between the first UE and a second UE using at least one of an optical sensor or a calibrated RF-based ranging mechanism. The first UE estimates a second distance between the first UE and the second UE using a non-calibrated RF-based ranging mechanism. The first UE computes an offset that indicates a difference between the estimated first distance and the estimated second distance, where the offset is associated with the non-calibrated RF-based ranging mechanism between the first UE and the second UE. The first UE outputs an indication of the offset that indicates the difference between the estimated first distance and the estimated second distance.

20 Claims, 14 Drawing Sheets

$\phi$ = Azimuth angle of departure (A-AoD)
$\theta$ = Zenith angle of departure (Z-AoD)
$\rho$ = Distance
$\phi'$ = Azimuth angle of arrival (A-AoA)
$\theta'$ = Zenith angle of arrival (Z-AoA)

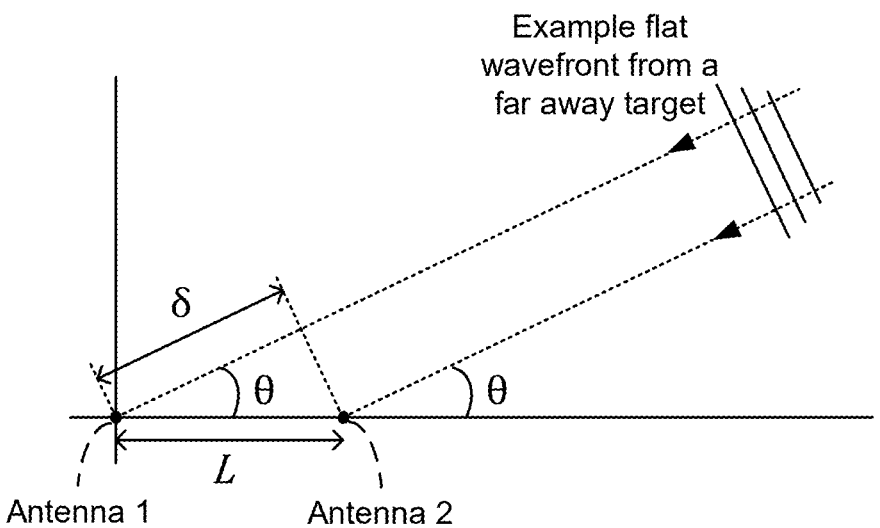
FIG. 10A
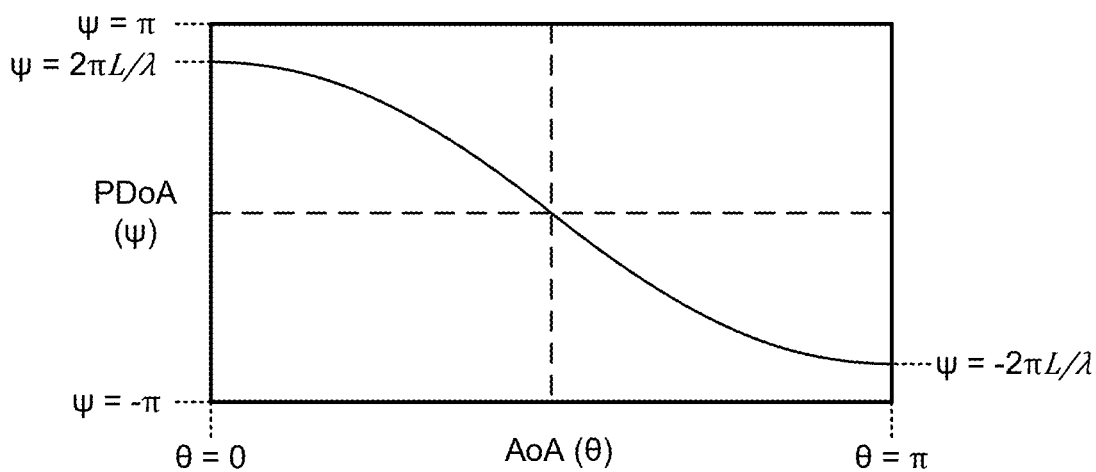
FIG. 10B

1200

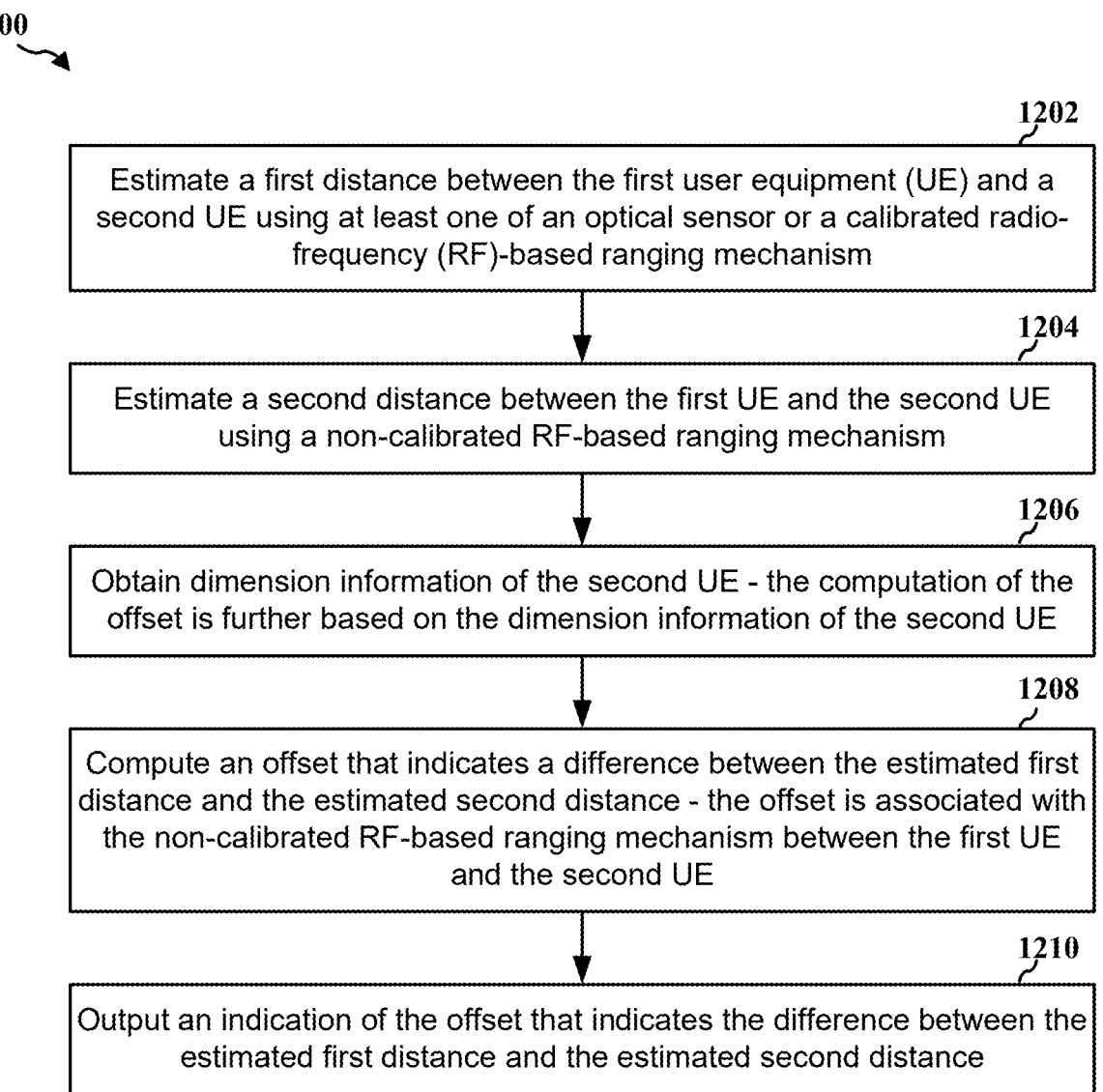

1202

Estimate a first distance between the first user equipment (UE) and a second UE using at least one of an optical sensor or a calibrated radio-frequency (RF)-based ranging mechanism

1204

Estimate a second distance between the first UE and the second UE using a non-calibrated RF-based ranging mechanism

1206

Obtain dimension information of the second UE - the computation of the offset is further based on the dimension information of the second UE

1208

Compute an offset that indicates a difference between the estimated first distance and the estimated second distance - the offset is associated with the non-calibrated RF-based ranging mechanism between the first UE and the second UE

1210

Output an indication of the offset that indicates the difference between the estimated first distance and the estimated second distance

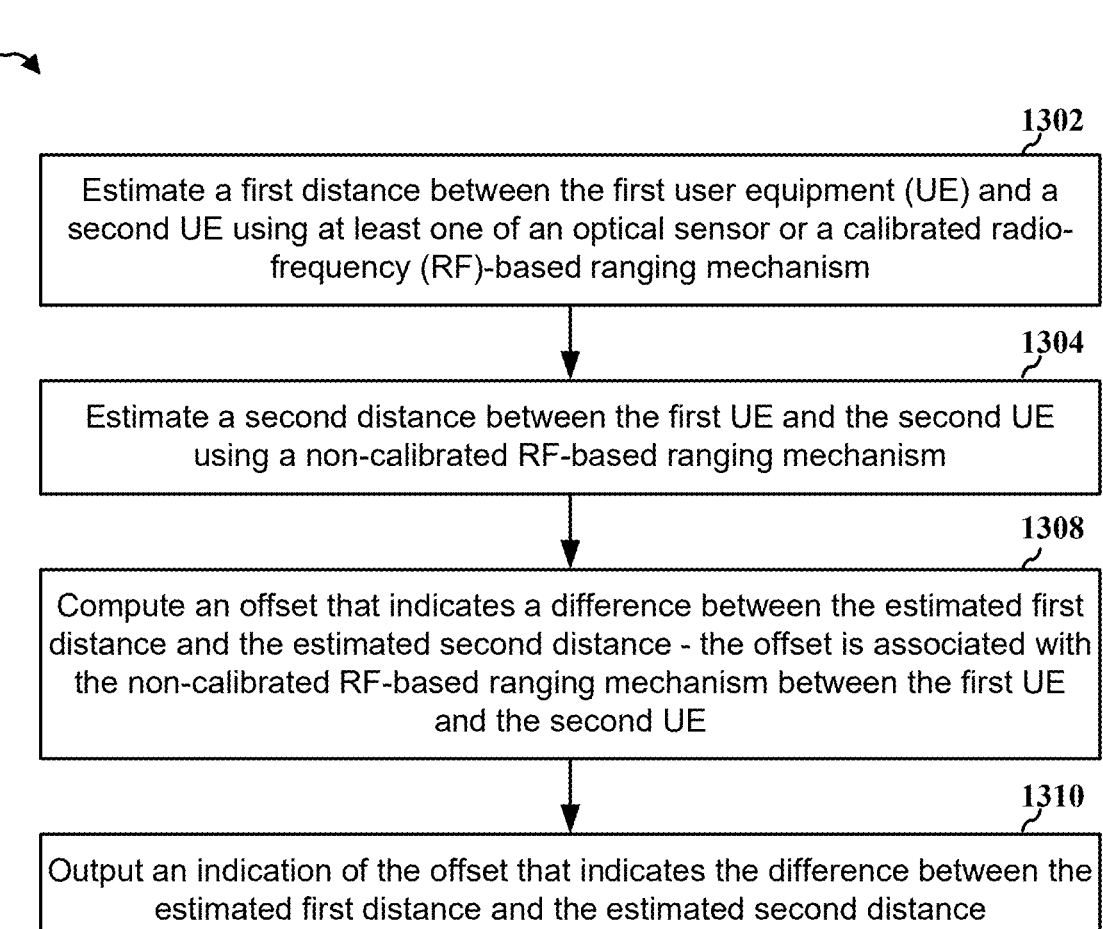

1302

Estimate a first distance between the first user equipment (UE) and a second UE using at least one of an optical sensor or a calibrated radio-frequency (RF)-based ranging mechanism

1304

Estimate a second distance between the first UE and the second UE using a non-calibrated RF-based ranging mechanism

1308

Compute an offset that indicates a difference between the estimated first distance and the estimated second distance - the offset is associated with the non-calibrated RF-based ranging mechanism between the first UE and the second UE

1310

Output an indication of the offset that indicates the difference between the estimated first distance and the estimated second distance

FIG. 13

OPTICALLY-ASSISTED CALIBRATION

TECHNICAL FIELD

The present disclosure relates generally to communication systems, and more particularly, to wireless communication involving tracking and ranging.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

Some telecommunication standards also provide positioning and tracking/ranging protocols and techniques that enable mobile network operators to provide high-accuracy location/tracking/ranging services to their subscribers. For example, 5G NR include various standards for network-based positioning that use signals and features of the 5G network to perform or improve the positioning of a device. There also exists a need for further improvements in these positioning protocols and techniques.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus estimates a first distance between the first UE and a second UE using at least one of an optical sensor or a calibrated radio-frequency (RF)-based ranging mechanism. The apparatus estimates a second distance between the first UE and the second UE using a non-calibrated RF-based ranging mechanism. The apparatus computes an offset that indicates a difference between the estimated first distance and the estimated second distance, where the offset is associated with the non-calibrated RF-based ranging mechanism between the first UE and the second UE. The apparatus outputs an indication of the offset that indicates the difference between the estimated first distance and the estimated second distance.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 10A is a diagram illustrating an example geometric configuration for angle-of-arrival (AoA) estimation using phase difference of arrival (PDoA) in accordance with various aspects of the present disclosure.

FIG. 10B is a diagram illustrating an example ideal curve for PDoA as a function of AoA in accordance with various aspects of the present disclosure.

FIG. 12 is a flowchart of a method of wireless communication.

FIG. 13 is a flowchart of a method of wireless communication.

DETAILED DESCRIPTION

Figure 1:
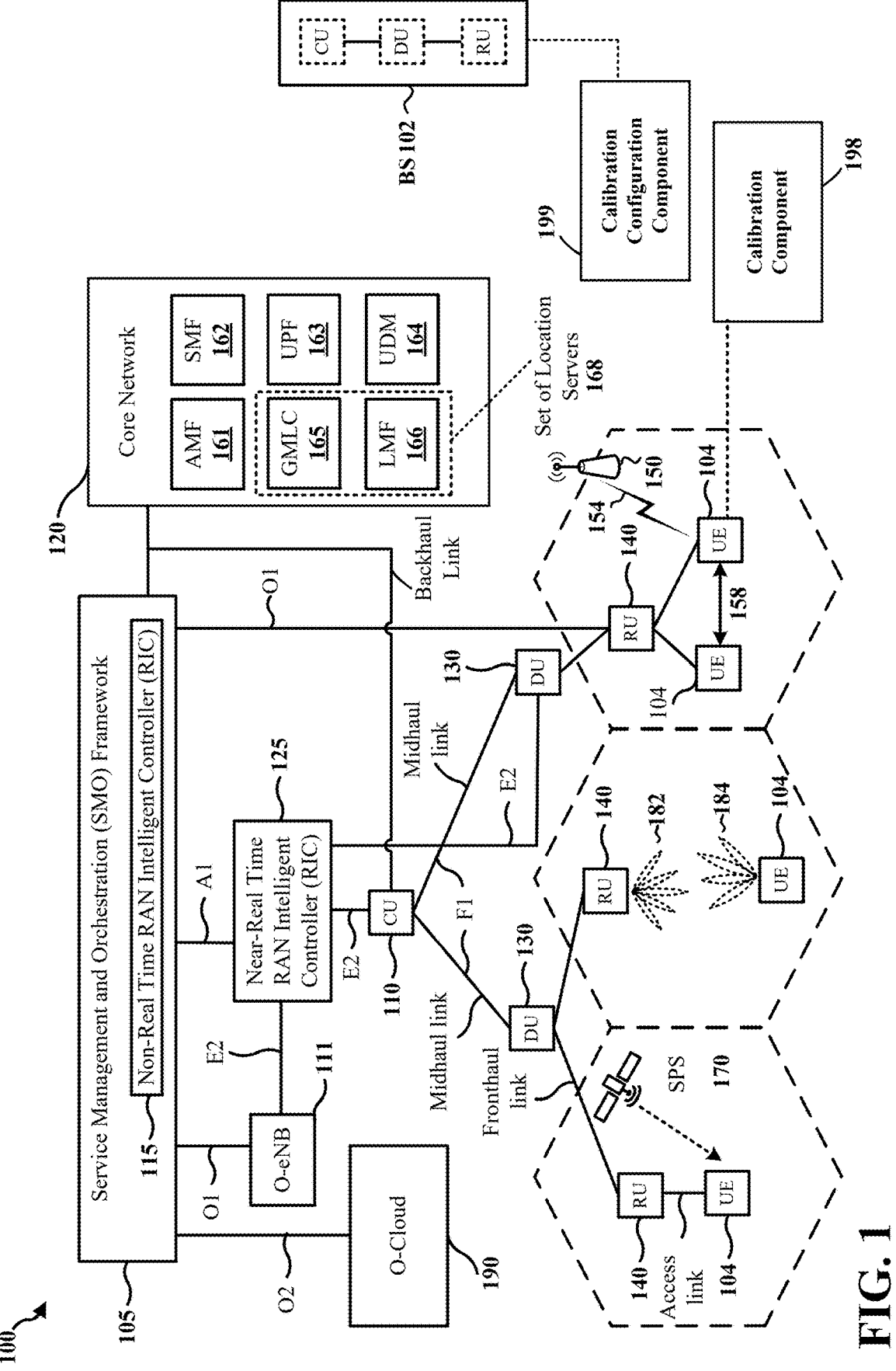
FIG. 1 is a diagram illustrating an example of a wireless communications system and an access network.

Various aspects relate generally to wireless communication and more particularly to tracking and/or ranging based on wireless communication. Some aspects more specifically relate to improving the overall performance of wireless tracking and ranging by simplifying the process of calibrating the radio frequency (RF) chains of a wireless device, where the wireless device may rely on an automatic calibration process after the wireless device is deployed in the field. For example, after device deployment, a wireless device may optically calculate range and/or ultrawide band (UWB) range between two devices, and compare the calculated range against the roundtrip-time (RTT) based range to determine the RF chain-based delay between the devices. The RF chain-based delay may be used to correct delays while doing time-of-flight (ToF) based ranging between the two devices. In one example, calibration results for one radio (e.g., Bluetooth®) may be used to calibrate for RTT of another radio (e.g., Wi-Fi®).

Particular aspects of the subject matter described in this disclosure can be implemented to realize one or more of the following potential advantages. Aspects presented herein may bring significant benefits, such as reducing the factory test time for each device, and making it feasible to use ranging technology in low-cost wireless devices. For example, aspects presented herein may enable wireless devices to have a reduced set of calibrations done at the factory, and to complete their calibration after they have been deployed in the field, using a fully automated mechanism.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a calibration component 198 that may be configured to estimate a first distance between the first UE and a second UE using at least one of an optical sensor or a calibrated radio-frequency (RF)-based ranging mechanism; estimate a second distance between the first UE and the second UE using a non-calibrated RF-based ranging mechanism; compute an offset that indicates a difference between the estimated first distance and the estimated second distance, where the offset is associated with the non-calibrated RF-based ranging mechanism between the first UE and the second UE; and output an indication of the offset that indicates the difference between the estimated first distance and the estimated second distance. In certain aspects, the base station 102 may have a calibration configuration component 199 that may be configured to provide configurations and/or parameters related to calibration for the UE 104.

Figures 2A, 2B, 2C, 2D:
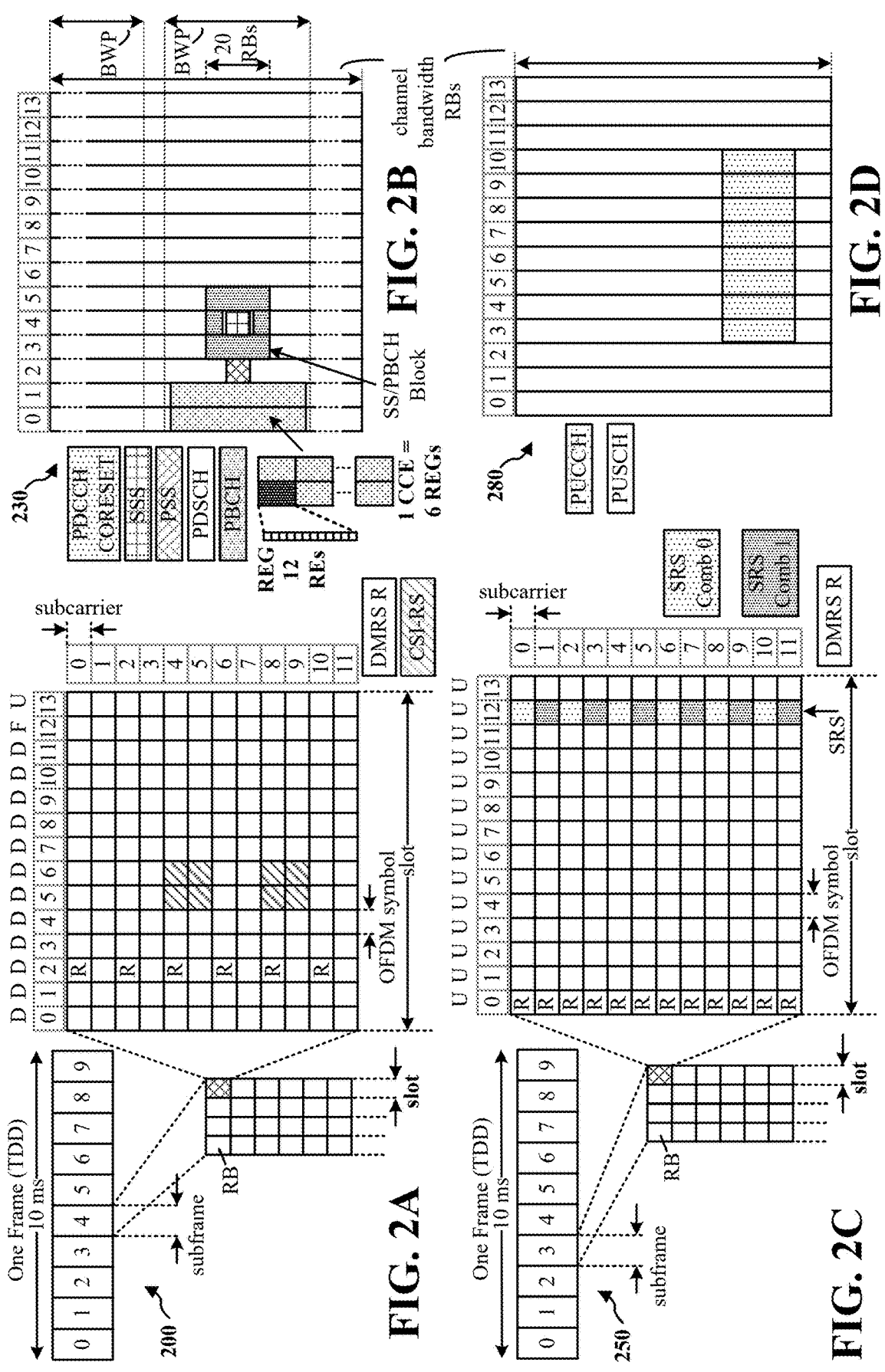
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

TABLE 1-continued

Numerology, SCS, and CP

| μ | SCS $\Delta f = 2^\mu \cdot 15[kHz]$ | Cyclic prefix |
|---|---|---|
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
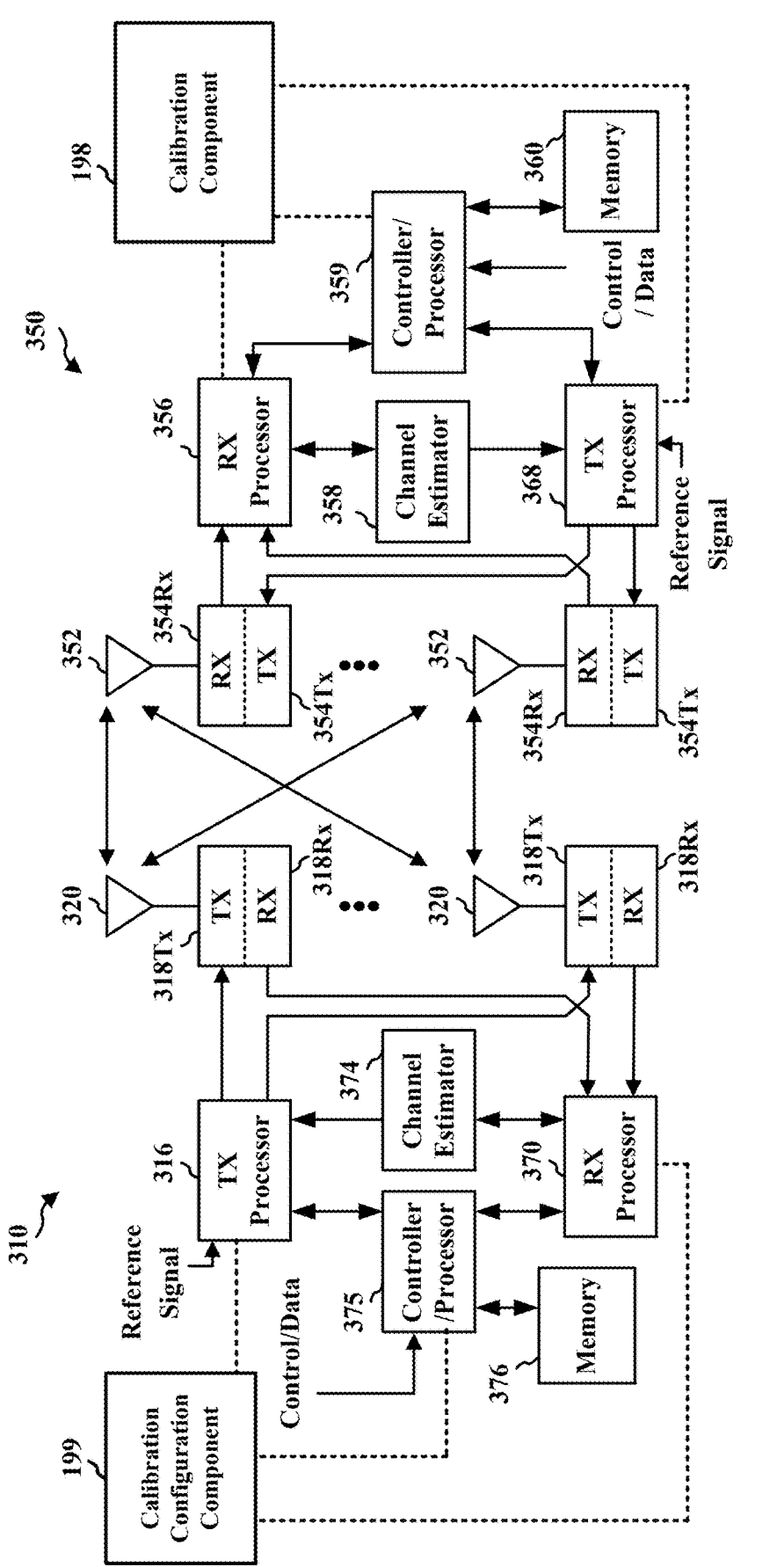
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the calibration component 198 of FIG. 1.

At least one of the TX processor 316, the RX processor 370, and the controller/processor 375 may be configured to perform aspects in connection with the UE NTN capability obtainment component 199 of FIG. 1.

Figure 4:
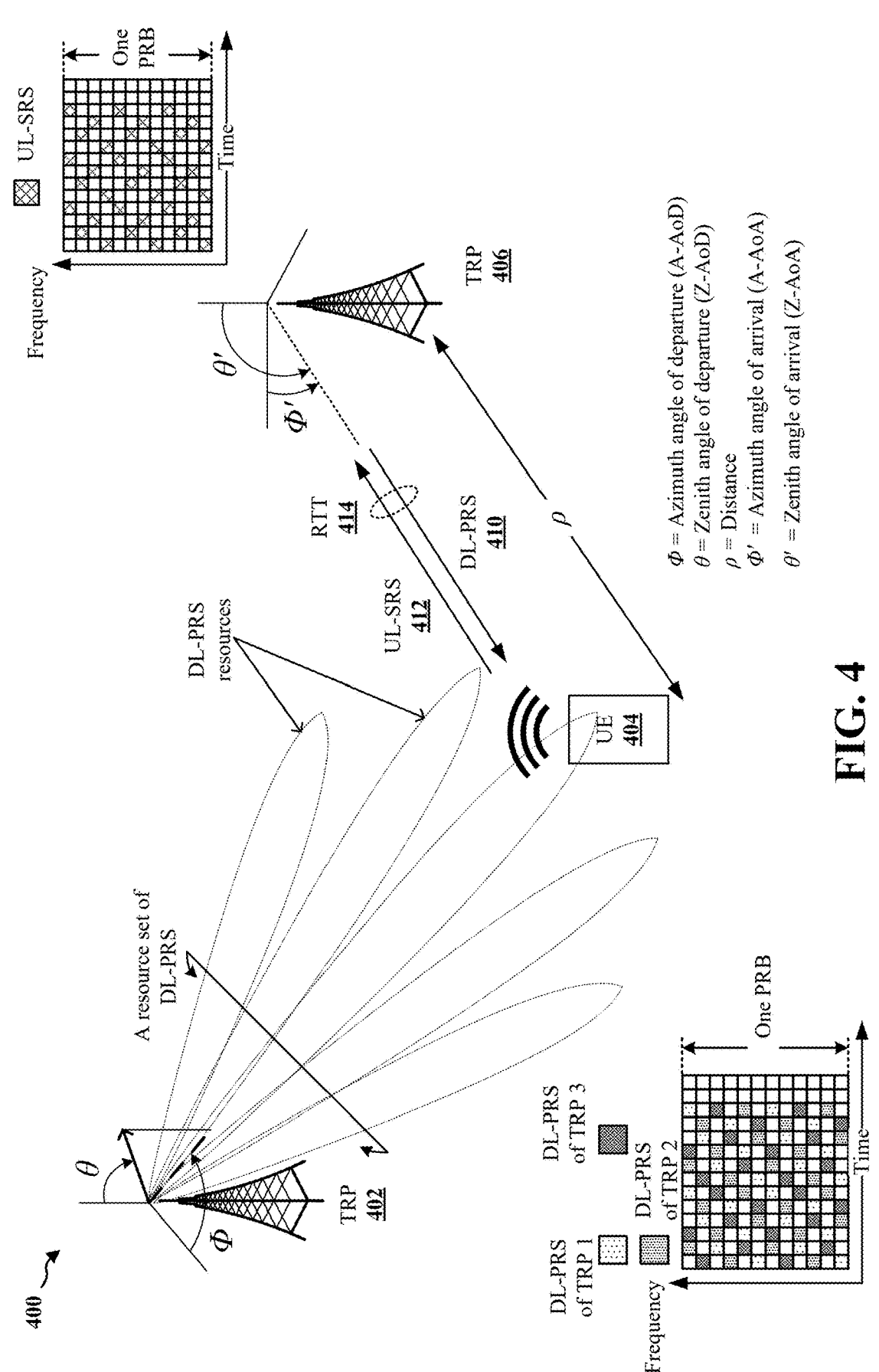
FIG. 4 is a diagram illustrating an example of a UE positioning based on reference signal measurements.

FIG. 4 is a diagram 400 illustrating an example of a UE positioning based on reference signal measurements (which may also be referred to as "network-based positioning") in accordance with various aspects of the present disclosure. The UE 404 may transmit UL SRS 412 at time $T_{SRS\_TX}$ and receive DL positioning reference signals (PRS) (DL PRS) 410 at time $T_{PRS\_RX}$. The TRP 406 may receive the UL SRS 412 at time $T_{SRS\_RX}$ and transmit the DL PRS 410 at time $T_{PRS\_TX}$. The UE 404 may receive the DL PRS 410 before transmitting the UL SRS 412, or may transmit the UL SRS 412 before receiving the DL PRS 410. In both cases, a positioning server (e.g., location server(s) 168) or the UE 404 may determine the RTT 414 based on $\|T_{SRS\_RX} - T_{PRS\_TX}| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL PRS reference signal received power (RSRP) (DL PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL SRS-RSRP at multiple TRPs 402, 406 of uplink signals transmitted from UE 404. The UE 404 measures the UE Rx-Tx time difference measurements (and/or DL PRS-RSRP of the received signals) using assistance data received from the positioning server, and the TRPs 402, 406 measure the gNB Rx-Tx time difference measurements (and/or UL SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

PRSs may be defined for network-based positioning (e.g., NR positioning) to enable UEs to detect and measure more neighbor transmission and reception points (TRPs), where multiple configurations are supported to enable a variety of deployments (e.g., indoor, outdoor, sub-6, mmW, etc.). To support PRS beam operation, beam sweeping may also be configured for PRS. The UL positioning reference signal may be based on sounding reference signals (SRSs) with enhancements/adjustments for positioning purposes. In some examples, UL-PRS may be referred to as "SRS for positioning," and a new Information Element (IE) may be configured for SRS for positioning in RRC signaling.

DL PRS-RSRP may be defined as the linear average over the power contributions (in [W]) of the resource elements of the antenna port(s) that carry DL PRS reference signals configured for RSRP measurements within the considered measurement frequency bandwidth. In some examples, for FR1, the reference point for the DL PRS-RSRP may be the antenna connector of the UE. For FR2, DL PRS-RSRP may be measured based on the combined signal from antenna elements corresponding to a given receiver branch. For FR1 and FR2, if receiver diversity is in use by the UE, the reported DL PRS-RSRP value may not be lower than the corresponding DL PRS-RSRP of any of the individual receiver branches. Similarly, UL SRS-RSRP may be defined as linear average of the power contributions (in [W]) of the resource elements carrying sounding reference signals (SRS). UL SRS-RSRP may be measured over the configured resource elements within the considered measurement frequency bandwidth in the configured measurement time occasions. In some examples, for FR1, the reference point for the UL SRS-RSRP may be the antenna connector of the base station (e.g., gNB). For FR2, UL SRS-RSRP may be measured based on the combined signal from antenna elements corresponding to a given receiver branch. For FR1 and FR2, if receiver diversity is in use by the base station, the reported UL SRS-RSRP value may not be lower than the corresponding UL SRS-RSRP of any of the individual receiver branches.

PRS-path RSRP (PRS-RSRPP) may be defined as the power of the linear average of the channel response at the i-th path delay of the resource elements that carry DL PRS signal configured for the measurement, where DL PRS-RSRPP for the 1st path delay is the power contribution corresponding to the first detected path in time. In some examples, PRS path Phase measurement may refer to the phase associated with an i-th path of the channel derived using a PRS resource.

DL-AoD positioning may make use of the measured DL PRS-RSRP of downlink signals received from multiple TRPs 402, 406 at the UE 404. The UE 404 measures the DL PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL PRS-RSRP) of downlink signals received from multiple TRPs 402, 406 at the UE 404. The UE 404 measures the DL RSTD (and/or DL PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL SRS-RSRP) at multiple TRPs 402, 406 of uplink signals transmitted from UE 404. The TRPs 402, 406 measure the UL-RTOA (and/or UL SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404. For purposes of the present disclosure, a positioning operation in which measurements are provided by a UE to a base station/positioning entity/server to be used in the computation of the UE's position may be described as "UE-assisted," "UE-assisted positioning," and/or "UE-assisted position calculation," while a positioning operation in which a UE measures and computes its own position may be described as "UE-based," "UE-based positioning," and/or "UE-based position calculation."

Additional positioning methods may be used for estimating the location of the UE 404, such as for example, UE-side UL-AoD and/or DL-AoA. Note that data/measurements from various technologies may be combined in various ways to increase accuracy, and/or to to determine enhance certainty, to supplement/complement measurements, and/or to substitute/provide for missing information.

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. To further distinguish the type of PRS, a downlink positioning reference signal may be referred to as a "DL PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS." In addition, the term "location" and "position" may be used interchangeably throughout the specification, which may refer to a particular geographical or a relative place.

In addition to the network-based positioning described in connection with FIG. 4, various positioning methods/mechanisms have also been developed for localizing or tracking the position of a target. These positioning methods/mechanisms may be classified into active positioning (which may also be referred to and used interchangeably with "active localization") and passive positioning (which may also be referred to and used interchangeably with "passive localization"). For active positioning, a wireless device may locate a target based on signals transmitted from the target. For example, the target may be attached or configured with a radio frequency (RF)-capable device/component, such as a tag (e.g., an RF tag), a Global Positioning System (GPS)/wireless tracker, a device/component capable of transmitting/receiving positioning reference signals, a device/component capable of performing or responding to ranging/radar operations, etc. Then, based on signals transmitted form the target (or from the RF-capable device/component attached to the target), the wireless device may calculate or estimate the location of the target. On the other hand, for passive positioning, a target may be localized and tracked without attaching an RF-capable device/component to the target. For example, RF radars, Lidars, sonars, and/or cameras are example technologies/components that may be used by a wireless device for passive positioning, where the wireless device may locate a target based on images or based on reflection of signals.

A wireless device may be able to locate and track another wireless device based on using one or more tracking technologies. For purposes of the present disclosure, tracking technologies may refer to methods and systems that are used for estimating, monitoring, and/or following the movements/locations of a target (e.g., an object, a person, an animal, a vehicle, etc.) over time. Tracking technologies may have different applications across various industries, and may use different principles and devices to achieve the tracking. Depending on implementations, some tracking technologies may be based on ranging operations, which may be referred to as ranging technologies. A ranging operation/technology may refer to a method/technique that is used to measure the distance between two points or objects. An example of ranging operation/technology may include a user locating a target device (e.g., a Bluetooth® device such as a pair of earbuds) using a mobile device (e.g., a smartphone), where the mobile device may continue to estimate the distance and/or location of the target device based on signals from the target device. Depending on the context, in some examples, the term "track/tracking" may be used interchangeably with the term "position/positioning" or "location/locationing." For example, a wireless device may be configured to track a target based on estimating the position/location of the target using Wi-Fi technologies, which may be referred to as Wi-Fi tracking or Wi-Fi positioning/locationing. Similarly, depending on the context, in some examples, the term "tracking" may be used interchangeably with the term "ranging." For example, a wireless device may be configured to track a target based on performing ranging against the target using UWB technologies, which may be referred to as UWB/UWB-based tracking or ranging.

The tracking technologies may be used in various fields such as surveying, navigation, robotics, telecommunications, etc. Examples of tracking technologies may include:

(1) global navigation satellite system (GNSS)/global positioning system (GPS) tracking—GNSS/GPS tracking relies on a network of satellites to provide real-time location information. GNSS/GPS receivers, often embedded in devices like smartphones, vehicles, or wearables, may determine their precise location and movement.

(2) radio-frequency identification (RFID) tracking—RFID technology uses radio waves to identify and track objects equipped with RFID tags, where these RFID tags may include electronic information that can be read by RFID readers, enabling the tracking of items in logistics, inventory management, and access control.

(3) Bluetooth® (BT) tracking—Bluetooth technology may be used for tracking by measuring the signal strength between devices. Bluetooth channel sounding (CS) (BTCS) is another technique that may also be used for tracking by measuring the round-trip-time (RTT)/the phase delay of RF signals between devices. Bluetooth beacons or tags may be attached to objects or carried by individuals, and their proximity to Bluetooth receivers may be used to estimate their location.

(4) Wi-Fi® tracking—Wi-Fi tracking may involve using signals from Wi-Fi access points (APs) to estimate the location of target devices. This tracking method is often suitable for indoor environments, such as malls and airports, for tracking people or assets.

(5) cellular tracking—mobile network infrastructure may be able to track devices through the triangulation of cell tower signals. The approximate location of a mobile device can be determined by analyzing the signals it receives from nearby cell towers.

(6) inertial navigation systems—these systems may use accelerometers and gyroscopes to track changes in velocity and orientation.

(7) computer vision tracking—advanced computer vision technologies, including object recognition and tracking algorithms, may enable cameras and sensors to track the movement of objects or people based on visual data.

(8) ultra-wideband (UWB) tracking—UWB tracking may utilize signals with very high frequency ranges or bandwidths. UWB technology transmits data using a broad spectrum of frequencies, enabling precise and accurate tracking of objects or individuals in both indoor and outdoor environments. UWB tracking systems typically operate in the frequency range of 3.1 to 10.6 gigahertz.

As discussed above, ranging operations/technologies may refer to methods/techniques that is used to measure the distance between two points or objects. Examples of ranging operations/technologies may include:

(1) triangulation—triangulation involves measuring the angles between an observer and two known points or landmarks. By using trigonometry, the distance to the object may be calculated or estimated.

(2) time of flight (ToF)—ToF technology measures the time taken for a signal (such as light or sound) to travel from a transmitter to a target and back to a receiver. By knowing the speed of the signal, usually the speed of light or sound, the distance may be calculated or estimated.

(3) GNSS—GNSS systems, such as GPS, global navigation satellite system (GLONASS), Galileo, and Bei-Dou, use signals from satellites to determine the position of a receiver on Earth. By analyzing the time it takes for signals from multiple satellites to reach the receiver, its position (including distance) may be calculated or estimated.

(4) RFID—RFID technology uses electromagnetic fields to automatically identify and track tags attached to objects. The distance between the reader and the RFID tag may be estimated based on the strength of the received signal.

(5) ultrasonic ranging—ultrasonic ranging involves emitting ultrasonic pulses and measuring the time it takes for the pulses to bounce back from the object. The speed of sound in the medium determines the distance.

(6) laser ranging (e.g., light detection and ranging (Lidar))—laser ranging uses lasers to measure the distance to a target by calculating the time it takes for laser pulses to travel to the target and back.

Among the aforementioned tracking/ranging technologies, UWB, Bluetooth, and/or Wi-Fi based tracking/ranging have continued to be widely used and developed for most wireless devices (e.g., consumer devices such as mobile phones, smart watches, etc.) due to their accessibility and tracking/ranging precisions.

UWB tracking/ranging may refer to using a UWB device/technology to locate and track objects, people, or assets within a certain range. A UWB device (e.g., a device that is capable of performing UWB tracking/ranging) may use pulse-based radio signaling (e.g., Short-pulse-UWB) instead of orthogonal frequency division multiplexing (OFDM)-based signaling (e.g., Multi-Band (MB)-OFDM-UWB (MB-OFDM-UWB)). Short-pulse-UWB signaling may transmit with the energy for each bit spread over the entire UWB channel bandwidth (e.g., 1.37 GHz, 4 GHz, etc.) with varying pulse amplitude and/or pulse polarity without using a RF carrier while MB-OFDM-UWB may transmit each bit using a 4 MHz bandwidth channel.

Using short-pulse-UWB signaling systems may provide several advantages over MB-OFDM-UWB signaling systems and other OFDM-based systems. For example, a short-pulse-UWB signaling system may provide better fading characteristics (e.g., Gaussian-modeled fading versus Rayleigh-modeled fading, and/or less than 1% of channels experiencing 2 dB or more fading) than an MB-OFDM-UWB signaling system. As other examples, a short-pulse-UWB signaling system may operate accurately without employing FEC (Forward Error Correction), using no-rake processing, with lower peak-to-average RF, and/or with longer battery life than an MB-OFDM-UWB signaling system. Short-pulse-UWB also does not use traditional modulation and demodulation techniques such as Fast Fourier Transforms (FFT), but may use time-domain or space-time processing techniques. Short-pulse-UWB may utilize various shapes (e.g., Gaussian pulses, Monocycle pulses, Hermite pulses, etc.) and the shape used may be chosen based on their properties in time and frequency domains among other factors, such as Bandwidth utilization, Interference Mitigation, Power Spectral Density, Multipath fading and inter-symbol interference, design complexity, power consumption, range, tradeoffs for ultra-fast sampling, etc. Short-pulse-UWB, in some cases, may benefit from a high speed Analog-to-Digital converter (ADC) and a high speed Digital-to-Analog Converter (DAC) to be able to handle the very wide frequency band used; however, there may be other ways to handle the need for ultra-fast sampling such as using Time Hopping techniques, Direct Sequence coding techniques, etc.

MB-OFDM-UWB may divide up spectrum into several frequency sub-bands and OFDM is applied within each band; whereas, other OFDM systems may typically operate within a fixed frequency band. The complex waveform created by combining the multiple-sub-bands results in a final waveform that used for transmission for MB-OFDM-UWB. MB-OFDM-UWB also varies from other OFDM systems by not using a guard interval, using simpler modulation schemes like Binary Phase Shift keying (BPSK) or Quadrature phase-shift keying (QPSK) vs. 64 or 256 Quadrature Modulation (QAM), utilizes a constant power level whereas other OFDM systems may utilize power control for varying channel conditions, etc.

Bluetooth tracking/ranging may refer to using Bluetooth device/technology to locate and track objects, people, or assets within a certain range. This technology may rely on Bluetooth-enabled devices, such as smartphones, tablets, or specialized Bluetooth tags, to communicate with each other and determine their relative positions.

Bluetooth tracking may include beacon-based tracking and Bluetooth low energy (LE) tracking. Beacon-based tracking may involve deploying Bluetooth beacons that emit Bluetooth signals at regular intervals. These signals are picked up by Bluetooth-enabled devices in the vicinity, such as smartphones or tablets. By measuring the signal strength and timing of these beacon signals, the receiving devices can estimate their proximity to the beacon. This information may then be used to determine the location of the Bluetooth-enabled device within the range of the beacon. Bluetooth LE tracking may enable devices to communicate over short distances while consuming minimal power. Bluetooth LE tracking systems may include attaching tags to objects or carried by individuals, and Bluetooth LE receivers (such as smartphones or dedicated receivers) that scan for these tags. The receivers detect the signals transmitted by the tags and use signal strength and other parameters to estimate the distance between the tag and the receiver. By triangulating signals from multiple receivers, the system can determine the location of the tagged object or person. Bluetooth channel sounding (CS) is a technique used in Bluetooth communication to measure time/phase delay of BT signals, such that distance between wireless devices may be estimated/measured more accurately.

Wi-Fi tracking/ranging may refer to using a Wi-Fi capable device/technology for monitoring and tracking the movement of devices within a Wi-Fi network's coverage area. Wi-Fi tracking may rely on the unique media access control (MAC) addresses of Wi-Fi-enabled devices, such as smartphones, tablets, and laptops, to identify and track them as they move within the network's range. For example, Wi-Fi tracking utilizes Wi-Fi access points (APs), which are devices that provide wireless network connectivity to devices within their range. These access points continuously broadcast Wi-Fi signals, allowing Wi-Fi-enabled devices to connect to the network. When Wi-Fi-enabled devices come within range of Wi-Fi access points, they may be configured to automatically send out probe requests, seeking available networks to connect to. Wi-Fi access points receive these probe requests and respond with probe responses containing information about the network, such as the service set identifier (SSID) and signal strength. Each Wi-Fi-enabled device may have a unique MAC address associated with its network interface. Wi-Fi tracking systems capture these MAC addresses from the probe requests and responses exchanged between devices and access points. By monitoring the signal strength and timestamps of probe requests and responses from multiple access points, Wi-Fi tracking systems may triangulate the position of Wi-Fi-enabled devices within the network's coverage area.

Figure 5:
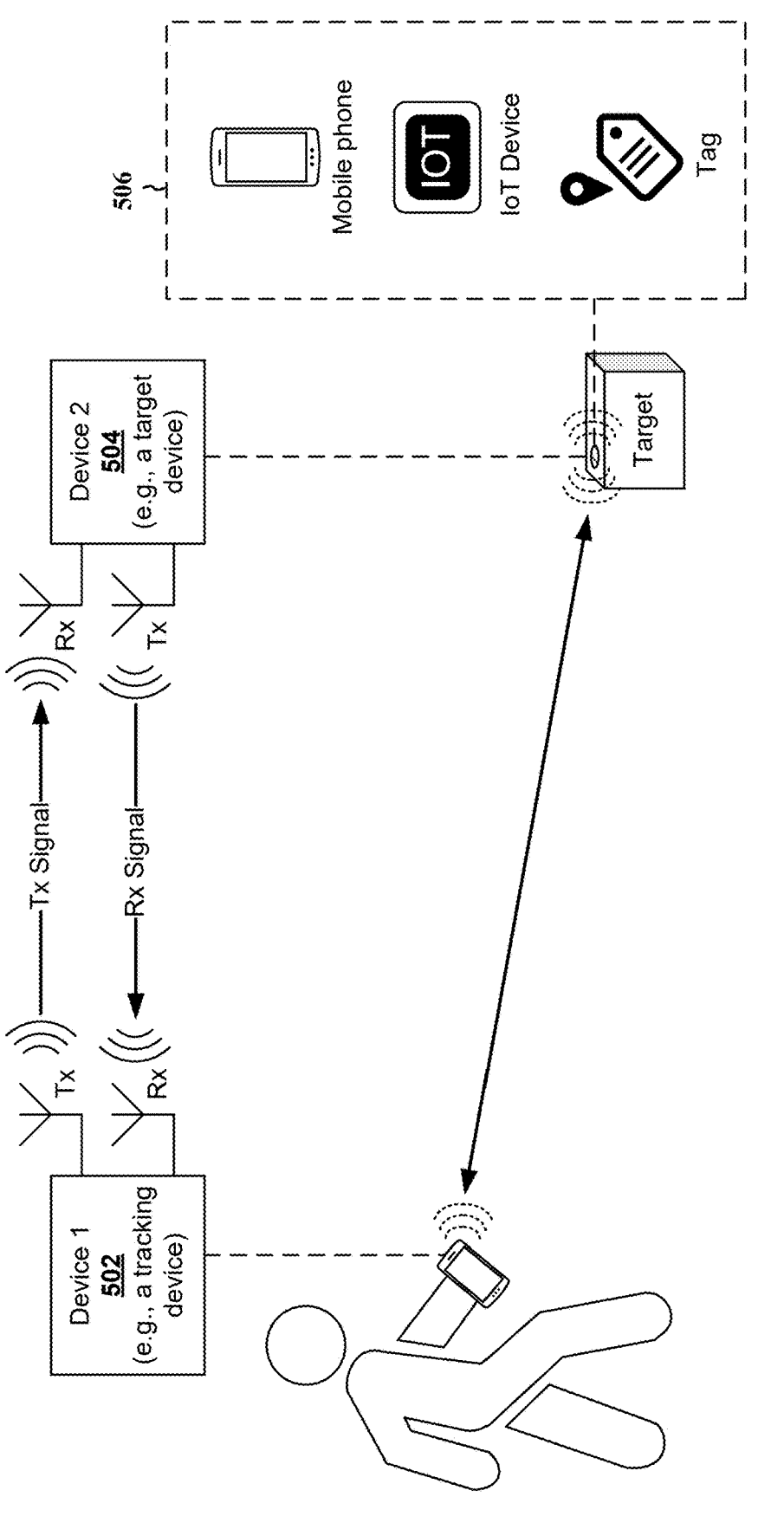
FIG. 5 is a diagram illustrating an example of tracking in accordance with various aspects of the present disclosure.

FIG. 5 is a diagram 500 illustrating an example of tracking (e.g., active positioning) in accordance with various aspects of the present disclosure. A first device 502 (which may also be referred to as a "tracking device" or a "finder device" for purposes of the present disclosure) may be able to locate a second device 504 (which may also be referred to as a "target" or a "target device" for purposes of the present disclosure) based on transmitting signals (which may be referred to as "transmission (Tx) signals") to the second device 504, and receive signals (which may be referred to as "reception (Rx) signals") from the second device 504. Depending on implementations, the Rx signals may be signals reflected from the second device 504 (e.g., based on the Tx signals) or signals generated by the second device 504. Then, based on the time-of-flight (ToF) of the Tx signals and the Rx signals, the first device 502 may estimate the distance of the second device 504 from the first device 502. In some configurations, if the first device is also capable of measuring the angle-of-arrival (AoA) of the Rx signals, the first device 502 may also be able to estimate the direction of the second device 504 from the first device 502 (which may be referred to as the relative direction from the first device 502). As shown at 506, the second device 504 may be a mobile phone, an Internet of Things (IoT) device, or a tag (e.g., an RFID tag), and the localizing and/or tracking of the second device 504 may be based on using Bluetooth® tracking, Wi-Fi tracking, or UWB tracking, etc.

Figure 6:
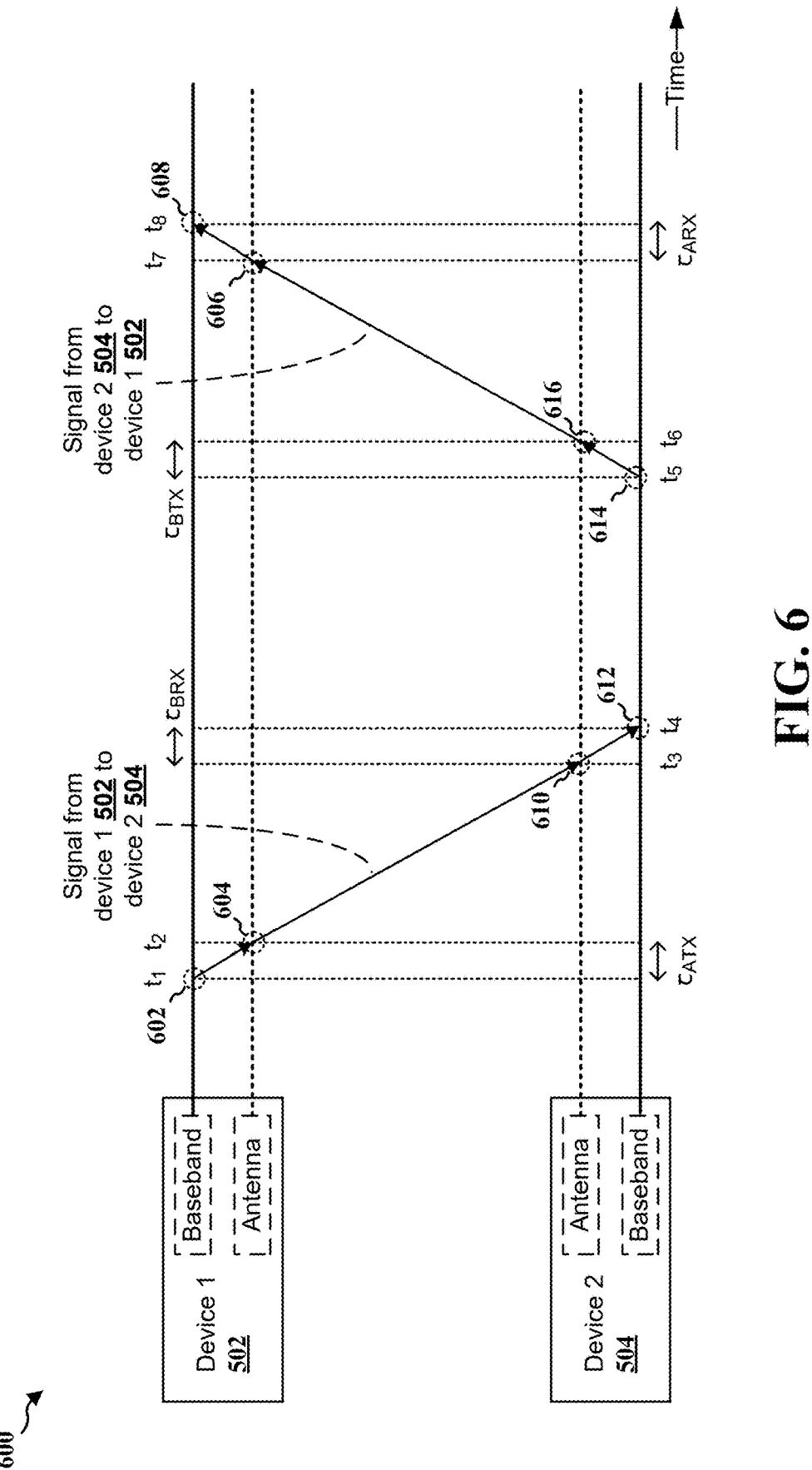
FIG. 6 is a diagram illustrating an example procedure for round-trip time (RTT)/time-of-flight (ToF) estimation that includes effect of device-specific delay in accordance with various aspects of the present disclosure.

FIG. 6 is a diagram 600 illustrating an example procedure for round-trip time (RTT)/time-of-flight (ToF) estimation that includes effect of device-specific delay in accordance with various aspects of the present disclosure. As discussed in connection with FIG. 5, wireless tracking/ranging technologies (such as based on UWB, Wi-Fi, or BT, etc.) may rely on measuring the ToF of wireless signals sent between two or more wireless devices (e.g., between the first device 502 and the second device 504). However, physical and/or electrical constraints in a wireless device may introduce timing errors associated with the transmission and/or reception of a signal. For example, when a wireless device transmits a signal (which may be referred to as a "transmitting device" or a "transmitting wireless device"), there may be a time delay from the time when a signal is generated (e.g., by a baseband of the wireless device) to the time when the signal is transmitted from the transmission (Tx) antenna of the wireless device. Similarly, when a wireless device receives a signal (which may be referred to as a "receiving device" or a "receiving wireless device"), from a signal reception perspective, there may also be a time delay from the time when a signal arrives at the reception (Rx) antenna of the wireless device to the time when the signal is processed and time-stamped at the baseband of the wireless device.

For example, as shown by the diagram 600, the first device 502 may include a baseband and an antenna (and/or other types of components related to wireless transmission). When the first device 502 transmits a signal to the second device 504, there may be a time delay from the time when the signal is generated at the baseband (e.g., as shown at 602) to the time when the signal is transmitted from the antenna (e.g., as shown at 604). When the first device 502 receives a signal transmitted from the second device 504, there may also be a similar time delay from the time when the signal arrives at the antenna (e.g., as shown at 606) to the time when the signal is processed and time-stamped at the baseband (e.g., as shown at 608).

Similarly, the second device 504 may include a baseband and an antenna (and/or other types of components related to wireless transmission). When the second device 504 receives a signal transmitted from the first device 502, there may be a time delay from the time when the signal arrives at the antenna (e.g., as shown at 610) to the time when the signal is processed and time-stamped at the baseband (e.g., as shown at 612). When the second device 504 transmits a signal to the first device 502, there may also be a time delay from the time when the signal is generated at the baseband (e.g., as shown at 614) to the time when the signal is transmitted from the antenna (e.g., as shown at 616). In some examples, the time delay(s) between the baseband and the antenna may cause the first device 502 and/or the second device 504's time measurements between transmitted signals and received signals to be inaccurate, which may reduce the accuracy of the positioning.

In order to measure the ToF accurately, each of the first device 502 and the second device 504 may be configured to compensate for delay(s) introduced by its radio frequency (RF) chain, which may include antennas, filters, amplifiers, switches, etc. For example, the real ToF (t) between the first device 502 and the second device 504 (collectively as "devices") may be calculated based on:

$$t = \frac{1}{2}\left[(t_7 - t_2) - (t_6 - t_3)\right]$$

However, the measured ToF(s) between the devices may be:

$$s = \frac{1}{2}\left[(t_8 - t_1) - (t_5 - t_4)\right]$$

$$s = \frac{1}{2}\left[[(t_8 - t_7) + (t_7 - t_2) + (t_2 - t_1)] - [(t_6 - t_3) - (t_6 - t_5) - (t_4 - t_3)]\right]$$

$$s = \frac{1}{2}\left[(t_7 - t_2) - (t_6 - t_3)\right] + \frac{1}{2}\left[(t_8 - t_7) + (t_2 - t_1) + (t_6 - t_5) + (t_4 - t_3)\right]$$

$$s = t + \frac{1}{2}\left[(\tau_{ARX} + \tau_{ATX}) + (\tau_{BTX} + \tau_{BRX})\right]$$

$$s = t + \frac{1}{2}[\tau_A + \tau_B]$$

where $\tau_A = (\tau_{ARX} + \tau_{ATX})$ and $\tau_B = (\tau_{BTX} + \tau_{BRX})$ The delay introduced by the RF chain may be dependent on all the individual components, and may change if any individual component changes. For example, if the first device 502 and the second device 504 are performing the tracking/ranging operation based on Wi-Fi and support multiple channels, it is likely that each Wi-Fi channel may introduce a slightly different delay.

An example process of the factory test for a given device may include measuring the delay for the combination of: (a) radio type (UWB, Wi-Fi, BTCS), (b) band (2.4 GHz/5 GHz/6 GHz for Wi-Fi), (c) channel center frequency, (d) channel bandwidth (20, 40, 80, 160, 320 MHz for Wi-Fi), (e) filtering settings, and/or (f) antenna, etc. As such, in commercial devices like smartphones, the total number of combinations that could have to be calibrated may be hundreds or thousands, making it impractical to measure all of them (as it may specify hours of testing for each device). Most systems may address this problem by calibrating just a reduced set of RF chains. For example, a smartphone vendor may decide to calibrate just one UWB antenna, and just for a couple of channels. This may mean giving up on the capability to perform ToF measurements with Wi-Fi or BT. For purposes of the present disclosure, an RF chain may refer to a sequence/set of components or stages in a system that handle radio frequency signals.

Aspects presented herein may improve the overall performance of wireless tracking and ranging by simplifying the process of calibrating the RF chains of a wireless device, where the wireless device may rely on an automatic calibration process after the wireless device is deployed in the field. Aspects presented herein may bring significant benefits, such as reducing the factory test time for each device, and making it feasible to use ranging technology in low-cost wireless devices. For example, aspects presented herein may enable wireless devices to have a reduced set of calibrations done at the factory, and to complete their calibration after they have been deployed in the field, using a fully automated mechanism. While examples below describe a possible implementation using mobile phones and accessories like earbuds, aspects presented herein may be extended to other types of devices, such as devices with radios capable of ranging and optical devices capable of estimating distance to a known target.

Figure 7:
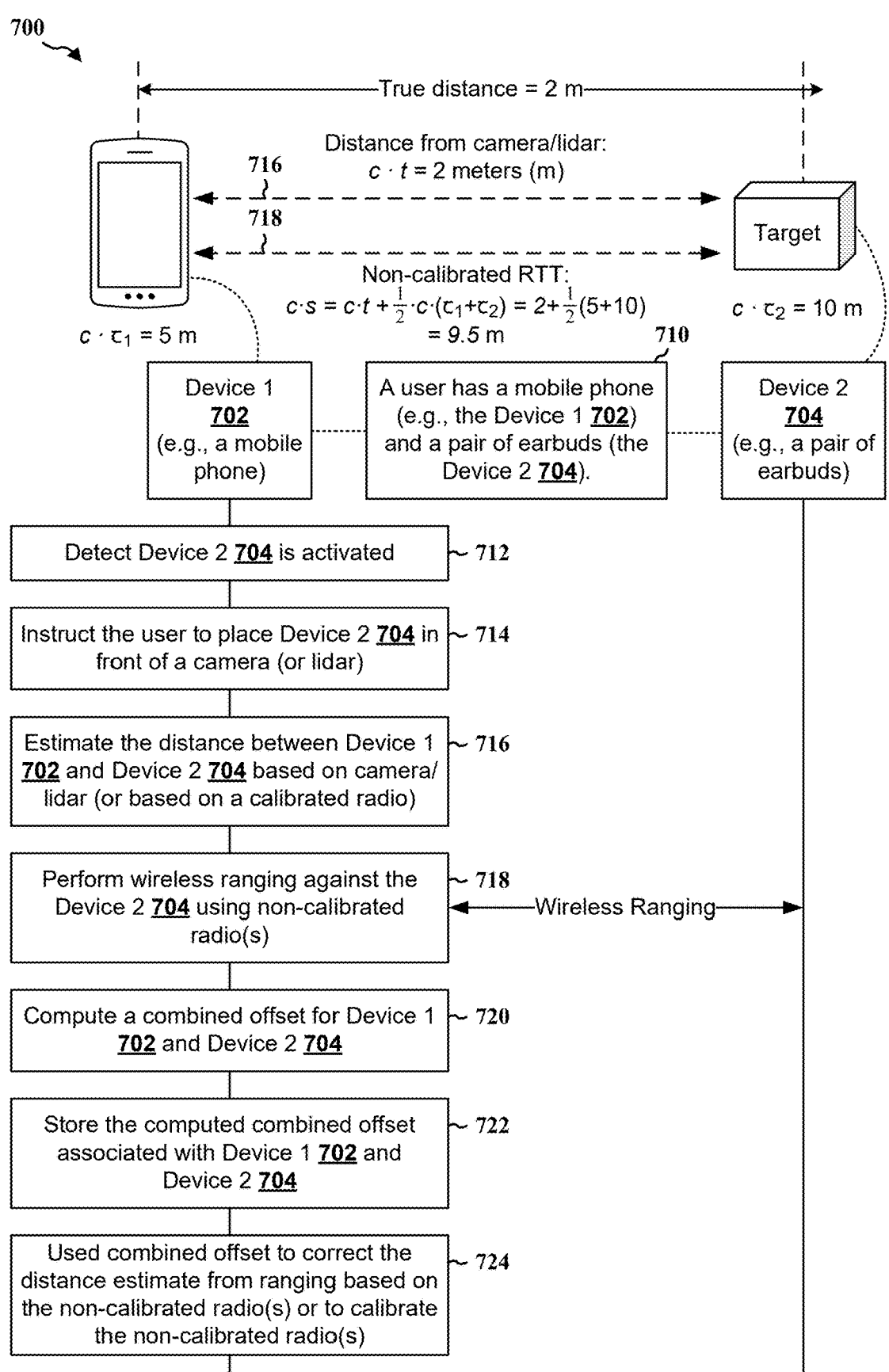
FIG. 7 is a diagram illustrating an example of a first device using an optical distance measurement to estimate the combined device-specific delay when ranging against a second device in accordance with various aspects of the present disclosure.

FIG. 7 is a diagram 700 illustrating an example of a first device using an optical distance measurement (e.g., camera/lidar) to estimate the combined device-specific delay (e.g., $\Sigma_i + \Sigma_j$) when ranging against a second device in accordance with various aspects of the present disclosure. For purposes of the illustration, the following notation may be used:

i, j Indices used to refer to individual devices (e.g., a first device 702, a second device 704, etc.), with i, j∈{1, 2}.

$\tau_i$ Total time delay (transmission plus reception) introduced by RF chain of node i. This may be unknown.

$\tau_j$ Total time delay (transmission plus reception) introduced by RF chain of node j. This may be unknown.

$t_{ij}$ True time-of-flight for wireless/optical signals between devices i and j.

$s_{ij}$ Measured time-of-flight between devices i and j based on non-calibrated radio.

If a wireless ranging session is established between devices i and j (e.g., between the first device 702 and the second device 704), the following mathematical relationship may hold:

$$s_{ij} = t_{ij} + \frac{1}{2}(\tau_i + \tau_j) \tag{1}$$

In one aspect of the present disclosure, if the first device 702 includes at least one optical mechanism (e.g., at least one camera, at least one lidar, etc) that is capable of estimating the distance between the first device 702 and a target (with high accuracy or with accuracy acceding an accurate threshold), the first device 702 may be configured to use the at least one optical mechanism to estimate the distance between the first device 702 and other devices that are within line-of-sight (LOS) of the first device 702. This may provide a way to calibrate the RF chain used for RF-based ranging (e.g., UWB ranging, BT ranging, Wi-Fi ranging, etc.). For example, if the second device 704 is within the LOS of the first device 702, the first device 702 may estimate the distance between the first device 702 and the second device 704 (collectively as "devices" hereafter) using the at least one optical mechanism.

As an illustration, assuming the second device 704 is a pair of earbuds that supports UWB, BT/BTCS, or Wi-Fi ranging technology. Also, assuming that to reduce manufacturing costs, the RTT delay radios of the second device 704 have not been calibrated. Then, a way to perform the calibration in the field (e.g., after the second device 704 left the manufacturer) may proceed as follows (e.g., described in connection with 712 to 724 below).

As shown at 710, a user may have a mobile phone (e.g., the first device 702) and a pair of (new) earbuds (e.g., the second device 704). At 712, when the user activates the earbuds, the mobile phone may detect the earbuds, and a corresponding provisioning mobile application (app) may show up on the screen of the mobile phone.

At 714, the mobile application may instruct the user to place the earbuds in front of the camera (or lidar) of the mobile phone. For example, the mobile application may request the user to place the earbuds on a table, so that the earbuds are at a fixed position during the provisioning process, or to hold the earbuds on the user's hand, etc. In some implementations, the first device 702 may include a user interface (UI), and the first device 702 may be configured to provide, at the UI, a guidance for placing the second device 702 at a designated area or in front of the first device 702 (e.g., in front of the camera of the first device 702). The UI may also include a graphical user interface (GUI) that is configured to display the second device 702 as the second device 702 moves (or display the live images/videos of the second device 702 as the second device 702 moves).

At 716, the mobile phone may use the camera (or lidar) to estimate the distance from the mobile phone to the earbuds. This may be done in a variety of ways. In one example, the mobile phone may have information related to the real physical size (e.g., dimension information) of the earbuds, which may be downloaded from the Internet or a server (e.g., from the manufacturer/vendor of the earbuds), or wirelessly broadcasted by the earbuds (or the case of the earbuds). Then, the mobile phone (or the application) may compare the apparent distance of the earbuds in the image against its real size in order to estimate the distance the mobile phone and the earbuds. In another example, the mobile phone may use a lidar or some other mechanism(s) that are capable of measuring the ToF of light between the mobile phone and the earbuds. In another example, the mobile phone may use a mechanism that is capable of tracking movements of the mobile phone itself (e.g., via IMU or camera, etc.) and using that information (e.g., the tracked movements of the mobile phone) to determine the parallax of the earbuds image.

For simplicity of illustration, the earbuds are assumed to be close to each other, and hence are being treated as one object. As such, the distance between each earbud and the mobile phone is assumed to be the same. In practice, the earbuds may be treated as separated objects (e.g., the second device 704 may be just one of the earbuds). In some examples, the earbuds may include a casing that is capable of wireless communication, and the casing may also be considered as a separated object (e.g., the second device 704 may be the casing).

At 718, while the mobile phone is measuring distance using optical methods (e.g., based on the at least one optical mechanism such as the camera, lidar, etc.) and obtaining the variable $t_{ij}$ (i.e., ToF for optical signals between devices), the mobile phone may also perform wireless ranging against the earbuds (or against the casing and each individual earbud depending on the implementation) using one of the non-calibrated radios (e.g., RF radios) to obtain the variable $s_{ij}$ (i.e., measured time-of-flight between devices based on the non-calibrated radio).

At 720, the mobile phone may compute a combined offset for the mobile phone and the earbuds (e.g., a combined offset of the first device 702 and the second device 704) based on:

$$(\tau_i + \tau_j) = 2\left(s_{ij} - t_{ij}\right)$$

26 where $\tau_i$ is the delay for the mobile phone (i.e., the first device 702), and $\tau_j$ is the delay for the earbuds (i.e., the second device 704). Note that $\tau_i$ and $\tau_j$ may not be able to be computed separately (e.g., they may be uncalibrated or with limited calibration). This process may be repeated with other devices connecting to the mobile phone (e.g., the casing, each earbud, etc.). Note the combined offset may be in various forms. For example, the combined offset may be a time offset (e.g., X seconds, microseconds, milliseconds, etc.) or a distance offset (e.g., Y meters, centimetres, millimetres, etc.).

At 722, after computing the combined offset, the mobile phone may store (e.g., output) the computed combined offset associated with the mobile phone and the earbuds (e.g., $\tau_i + \tau_j$), such that the mobile phone may have access to this information (e.g., to reuse this offset) in the future when the mobile phone is trying to find this specific pair of earbuds. The above process may be repeated for each device paired with the mobile phone (e.g., a smart watch, a tablet, a smart tag, etc.), so that the mobile phone may store the combined value of $(\tau_i + \tau_j)$ for each device.

In one example, the combined values for different devices may be stored as a table like below:

| Device | Radio Method | $\tau_i + \tau_j$ |
|---|---|---|
| Bob's left earbud | Bluetooth | 3.0 ns |
| Bob's right earbud | Bluetooth | 3.2 ns |
| Bob's earbud case | Bluetooth | 3.1 ns |
| Bob's left earbud | Wi-Fi 2.4G CH 11 | 5.2 ns |
| Bob's right earbud | Wi-Fi 2.4G CH 11 | 5.7 ns |
| Bob's smart tag | Bluetooth | 2.7 ns |
| Bob's smart tag | UWB channel 5 | 6.3 ns |
| Bob's smart tag | UWB channel 9 | 5.1 ns |
| Alice's earbud case | Bluetooth | 10.0 ns |
| Alice's smart phone | Bluetooth | 10.1 ns |
| Alice's smart phone | Wi-Fi 5G CH 36 | 2.6 ns |
| Alice's smart phone | Wi-Fi 5G CH 149 | 4.3 ns |
| Alice's smart phone | Wi-Fi 2G CH 11 | 5.6 ns |
| Alice's smart phone | UWB channel 5 | 1.1 ns |

Later one, when the user is trying to find the distance to a device, the mobile phone (or its application) may be configured to retrieve the RTT delay (e.g., $\tau_i + \tau_j$) associated with the device from the stored table and apply the corresponding RTT delay correction to the distance estimate from wireless ranging.

For example, as shown at 724, the mobile phone may use the stored combined offset associated with the mobile phone and the earbuds to correct the distance estimate from using the non-calibrated radio(s):

$$\hat{t}_{ij} = s_{ij} - \frac{1}{2}(\tau_i + \tau_j) \tag{2}$$

where $\hat{t}_{ij}$ is the corrected RTT estimate, $s_{ij}$ is the measured RTT estimate (based on the uncalibrated radio(s) and $(\tau_i + \tau_j)$ is obtained from the table of stored values above. This corrected RTT estimate $\hat{t}_{ij}$ may then be used to estimate the (actual) distance to the lost device (r), using equation:

$$r = c \cdot \hat{t}$$

where c is the speed of light.

Figure 8:
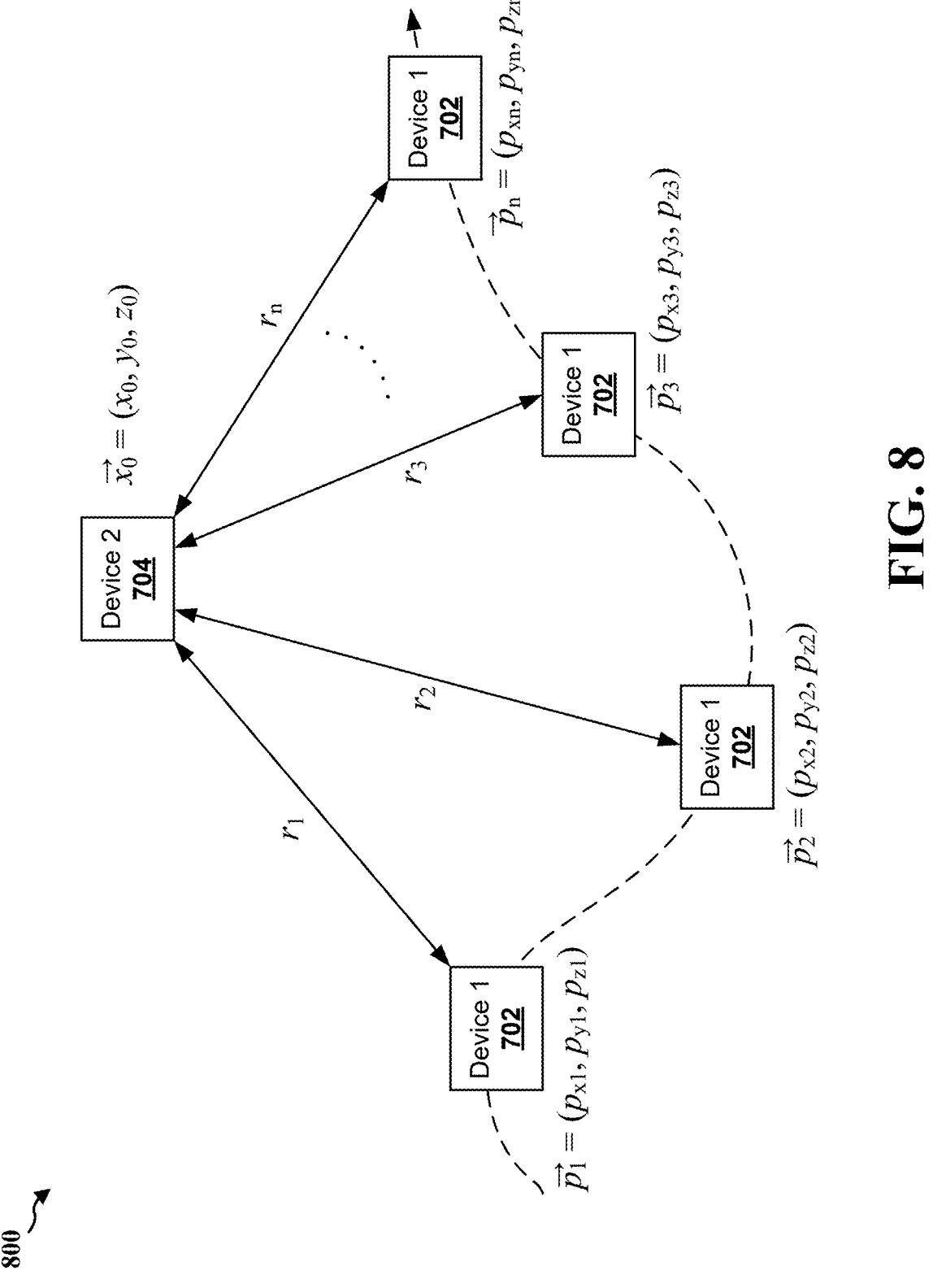
FIG. 8 is a diagram illustrating an example of the first device moving through space while measuring ToF distance to the second device in accordance with various aspects of the present disclosure.

In some implementations, the mobile phone may be configured to display this distance information to the user to guide the user in the process of finding the item, or the distance information may be fed into an algorithm that uses multiple distance measurements $r_i$ from multiple mobile phone positions $\vec{p}_i$ to determine the position of the lost device based on triangulation, such as shown by FIG. 8 (a diagram 800 showing the first device 702 moving through space while measuring ToF distance to the second device 704).

In another aspect of the present disclosure, at 716 of FIG. 7 or after 724 of FIG. 7, the mobile phone (e.g., the first device 702) may also be configured to use one radio to calibrate another radio, such as using a calibrated radio to calibrate an uncalibrated radio. In addition, the calibrated radio may be a radio that is previously uncalibrated and is calibrated based on using optical measurement (e.g., camera/lidar). For example, the mobile phone may use a calibrated radio (e.g., a calibrated Wi-Fi, Bluetooth, UWB, etc.) to get the RTT delay of an uncalibrated radio (e.g., an uncalibrated Wi-Fi, Bluetooth, UWB, etc.), without using the optical RTT (e.g., based on camera/lidar) as a reference. In addition, this calibrated radio may initially be an uncalibrated that is calibrated based on aspects described in connection with FIG. 7 (e.g., calibrated using an optical device).

As an illustration, assuming there are a phone and a pair of earbuds supporting two or more radios for ranging (e.g., Bluetooth and Wi-Fi ranging). During an initial provisioning process, the phone may use aspects described in connection with FIG. 7 to calibrate one of the radios (for example, the Bluetooth). Once this is done, the initial provisioning is done. Later on, when the user has the phone and the earbuds near each other (but not with LOS), the phone and the earbuds may perform ranging with both Bluetooth and Wi-Fi, and use the calibrated RTT estimate from the Bluetooth (which is now calibrated) to estimate the RTT delay of Wi-Fi. In another example, during manufacturing, both the phone and the earbuds may have their antennas calibrated for Bluetooth, but not for Wi-Fi. Once the products are used by the owner, they may use their calibrated RTT estimate from Bluetooth (which is now calibrated) to estimate the RTT delay of Wi-Fi.

In other words, in some implementations, the optical distance estimator (e.g., camera, lidar, etc.) may be calibrated at the factory. When the device is in the field, the device may use the optical distance estimator to calibrate the RTT delay of a first radio (radio 1). Then, the device may later use the first radio (radio 1) to calibrate a second radio (radios 2, 3, . . . , etc.). In some implementations, the first radio (radio 1) may be calibrated at the factory. When the device is in the field, the device may use the first radio (radio 1) to calibrate the RTT delay of a second radio (radios 2, 3, . . . , etc.).

Figure 9:
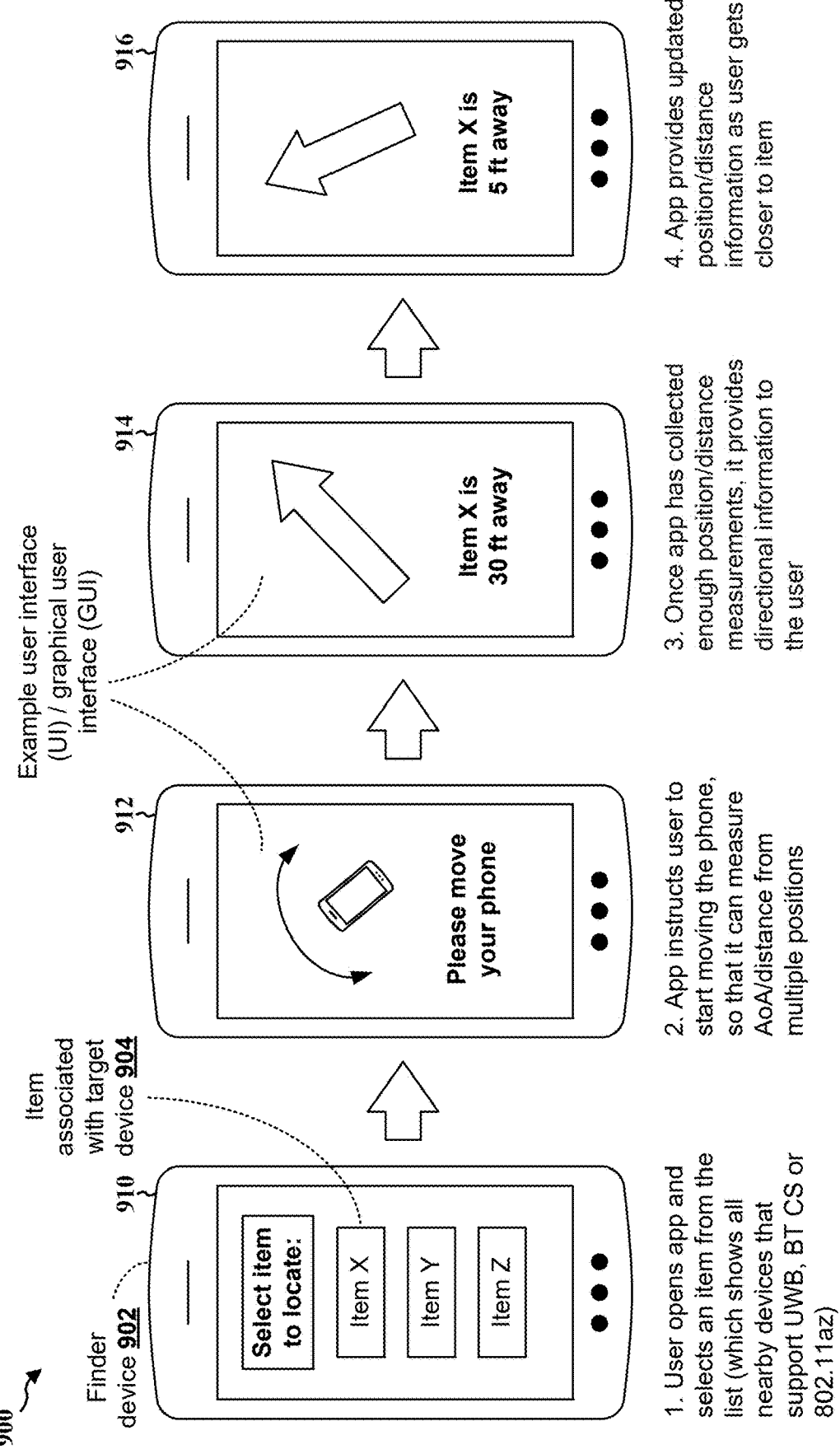
FIG. 9 is a diagram illustrating an example user experience of a finder device locating a target device in accordance with various aspects of the present disclosure.

FIG. 9 is a diagram 900 illustrating an example user experience of a finder device locating a target device in accordance with various aspects of the present disclosure. As shown at 910, a finder device 902 (e.g., a mobile phone) or an application running on the finder device 902 may instruct the user (e.g., via a user interface (UI)) to select an item (e.g., from a list of detected items) for tracking/locating. As shown at 912, after the user selects an item (e.g., item X) that is associated with a target device 904 (e.g., a UWB tag, a pair of Bluetooth earbuds, etc.), the finder device 902 may instruct the user to move the finder device 902, such that the finder device 902 may be able to measure the distance and/or AoA between the finder device 902 and the target device 904 from multiple positions. As shown at 914, after the finder device 902 has collected sufficient AoA/distance measurements, the finder device 902 may start providing directional information of the target device 904 to the user, such as by showing the direction and the distance of the target device 904 with respect to the finder device 902. Then, as shown at 916, the finder device 902 may continue to update the directional information of the target device 904 as the user moves, and may stop the update after the user locates the target device 904 (e.g., after the finder device 902 is within a threshold distance of the target device 904).

While most finder/tracking devices may be able to wirelessly determine the relative direction/position of a target device based on estimating the AoA of a wireless signal transmitted by the target device. Those finder/tracking devices may specify using at least a pair of antennas (e.g., using a minimum of two antennas) to measure the phase difference of arrival (PDoA) of the wireless signal. As there may be a defined/known mathematical relationship between the AoA (e.g., variable $\theta$) and the PDoA (e.g., variable w/), the finder/tracking devices may measure the PDoA ($\psi$) and then invert the relationship to obtain $\theta$. In other words, the AoA may be a variable of the PDoA function.

FIG. 10A is a diagram 1000A illustrating an example geometric configuration for AoA estimation using PDoA in accordance with various aspects of the present disclosure. Two antennas (e.g., antenna 1 and antenna 2) of a tracking/finder device (e.g., a smartphone, the first device 502/702, the finder device 902, etc.) may be separated by a distance L and the AoA from a target is $\theta$. Then, the radio signal may head to travel an extra distance $\delta$ to one of the antennas (e.g., antenna 1), with $\delta = L \cdot \cos \theta$.

Consider an ideal tracking/finder device (e.g., a smartphone, the first device 502/702, the finder device 902, etc.) with a pair of ideal isotropic antennas forming a vector $\vec{a}$ with length $L = \|\vec{a}\|$, where the tracking/finder device is at the origin of a coordinate system. Assume the target is in a position given by vector $\vec{x}_T$. Vector $\vec{x}_T$ forms an angle $\theta$ (e.g., the AoA) with the direction of antenna vector $\vec{a}$.

FIG. 10B is a diagram 1000B illustrating an example ideal curve for PDoA ($\psi$) as a function of AoA ($\theta$) in accordance with various aspects of the present disclosure. Under ideal conditions, the PDoA ($\psi$) measured by the system may be given by the equation:

$$\psi = g(\theta) = \frac{2\pi L}{\lambda} \cos \theta \qquad (3)$$

where function g(•) may be referred to as the PDoA function. In this ideal example, function g(•) may be dependent just on the angle $\theta$. This may assume that the tracking/finder device has a rotational symmetry around the antenna vector $\vec{a}$. Assuming that $$L < \frac{\lambda}{2},$$

there may be a one-to-one mapping between θ and ψ, so the function may be inverted to obtain θ:

$$\theta = \arccos\left(\psi \cdot \frac{\lambda}{2\pi L}\right) \qquad (4)$$

However, most tracking/finder devices may follow a non-ideal PDoA function g(θ). For example, antennas may be embedded in a wireless device (e.g., a smartphone) with other nearby components (e.g., battery, display, other antennas, etc.) that may cause signal reflections. Thus, an incoming wireless signal may be affected by the reflection before it reaches at least one of the antennas. One effect of the reflection is that the PDoA measured by the antenna pair may not follow the formula described in connection with Equation (3), which then has the side effect that Equation (4) may not be used to recover the spatial angle θ.

The example illustration of PDoA function g(•) assumed that there is a rotational symmetry around the antenna vector a, so its value may be dependent just on the angle θ. However, in a real system with nearby reflectors (e.g., a mobile device with multiple components surrounding its antennas), this rotational symmetry may be lost, and the PDoA function g(•) may depend on two angles:

$$\psi = g\,(\theta,\,\phi) \qquad (5)$$

where θ∈ [θ, π] is the angle subtended by the target position vector $\vec{x}_T$ and $\vec{a}$, while φ∈ [0, 2π] indicates an angle of rotation around d. In an ideal system the PDoA function g(•) may not depend at all on angle φ, but in the non-ideal system the PDoA function g(•) may depend on both θ and φ. In some examples, the PDoA function may be used for calculating an ideal or hypothetical PDoA value for a signal from a given set of points (θ, φ), where θ may be azimuth and φ may be elevation. In practice, the function g(θ, φ) may be specified to be obtained via a calibration process, where a sample of devices are configured to be measured in a controlled environment to obtain the function ψ=g(θ, φ) as described below.

In one aspect of the present disclosure, a tracking/finder device (e.g., the first device 502/702, the finder device 902, a mobile phone, a UE, etc.) may be configured to obtain a PDoA function (e.g., g(θ,φ)) related to the tracking/finder device. For example, the tracking/finder device may obtain the PDoA function via a calibration process, based on a lookup table (LUT) or a pre-configuration, and/or receive the PDoA function from another device (e.g., from a similar model device) or a network entity, etc.

In one example, the PDoA function for a representative sample of tracking/finder devices may be measured (which may be referred to as a "golden bin" or a "golden bin process"), so that the PDoA function may be later stored on the tracking/finder devices after they are manufactured. To obtain the PDoA function for the representative sample, the representative sample (e.g., the tracking/finder device) may be configured to be installed inside a controlled environment (e.g., such as in an anechoic chamber) where a target device may be positioned at various positions (r, θ, φ) relative to the tracking/finder device's frame of reference (which may also be referred to as a "reference frame"). For example, this may be achieved by either keeping the tracking/finder device fixed and moving the target device, or by keeping the target device fixed and rotating the tracking/finder device, or a combination of both methods. For purposes of the present disclosure, a frame of reference may refer to a set of coordinates that may be used to determine positions (and velocities) of objects in that frame, and different frames of reference may move relative to one another.

For each position of the target device and/or the tracking/finder device, the target device may be configured to send a wireless signal, and the tracking/finder device may measure and obtain the PDoA (ψ) of the wireless signal at each position using at least a pair of antennas (which may also be referred to as an "antenna pair").

In principle, the PDoA (ψ) may depend on the three-dimensional (3D) coordinates (r, θ, φ) of the target device relative to the tracking/finder device. However, if r (e.g., the distance between the tracking/finder device and the target device) is much larger than the distance between the antennas and their nearby reflectors (e.g., other hardware components surrounding the antennas), then the function g(r,θ, φ)=g(θ,φ), that is, g(•) may not depend on the distance r, and may just depend on angles θ and φ.

The calibration process may then measure g(•) for a sufficient number of values of (θ,φ)∈ {[0, 2π]×[0,π]}. The resolution chosen may depend on the amount of time available for this process and/or the specified AoA accuracy for a specific product. The calibration process may be performed for various RF frequencies in order to have a representative sample of all the frequencies to be used when the tracking/finder device is in production. For example, if the tracking/finder device uses UWB radios, then the tracking/finder device may be specified to be calibrated at UWB channels 5 to 12. On the other hand, if the tracking/finder device uses Wi-Fi, the tracking/finder device may be specified to be calibrated in the 2.4 GHz, 5 GHz, and 6 GHz bands (and potentially at different channels inside each band). Finally, the calibration process may be repeated with several different units of each tracking/finder device model, in order to take into account potential variability in g(•) due to component tolerances.

After the calibration process has been completed, the results may be represented in different ways, depending on system-specific constraints on memory or computing resources. For example, in some implementations, the results may be stored/represented as a lookup table, with some interpolation methods for values not found in the lookup table. In some implementations, the results may be stored/represented as a smooth mathematical function (e.g., a polynomial or a sum of trigonometric functions of (θ, φ)).

Regardless of the method used for storing or computing it, at this point it may be assumed that there is a function g(θ,φ) that is capable of approximating the actual PDoA (ψ) measured by the pair of antennas in the tracking/finder device, when the target device is at (θ, φ).

It may be noted that the angles (θ, φ) mentioned above are the spherical coordinates relative to the tracking/finder device's reference frame. They may not be angles relative to the antenna vector $\vec{a}$, because it is possible that the antenna vector $\vec{a}$ is not aligned with the any of the (x, y, z) axes of the tracking/finder device's reference frame.

Figure 11:
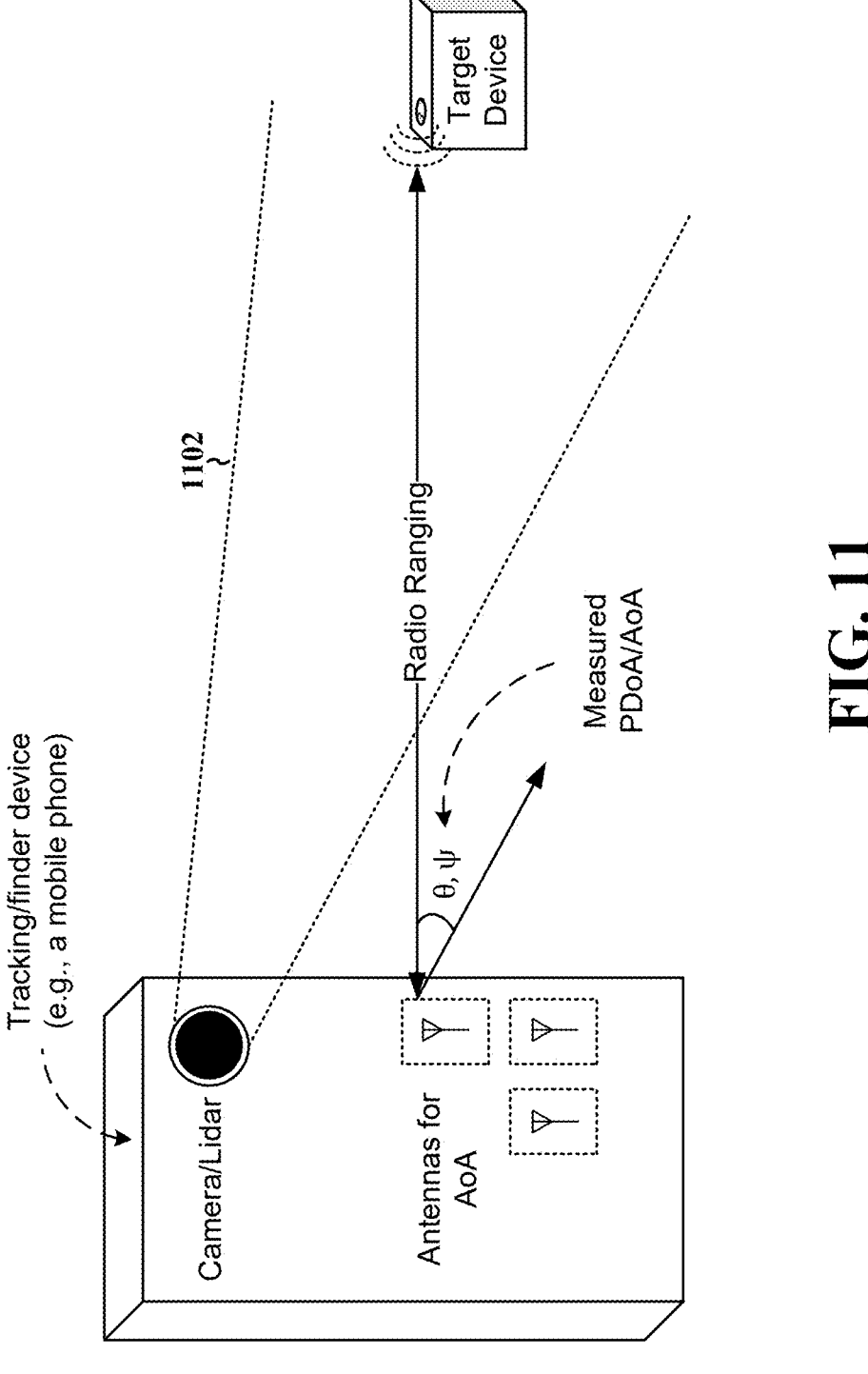
FIG. 11 is a diagram illustrating an example of using a camera to optically detect the position of a known object and using the detected position information to adjust the calibration of the PDoA function for a specific tracking/finder device in accordance with various aspects of the present disclosure.

FIG. 11 is a diagram 1100 illustrating an example of using a camera to optically detect the position of a known object and using the detected position information to adjust the calibration of the PDoA function for a specific tracking/finder device in accordance with various aspects of the present disclosure. In some implementation, other mechanisms for obtaining the device-specific PDoA function $g(\theta, \psi)$ may be available, such as using optical devices (e.g., camera(s), lidar(s), etc.).

For example, as shown at 1102, a user may be instructed to put a target device (such as an earbud, or an earbuds case, or another tracking/finder device, etc.) in front of the tracking/finder device (e.g., a mobile phone), in such a way that the camera/lidar of the tracking/finder device is able to detect it. The tracking/finder device may then use the camera (and/or other sensors such as time-of-flight (ToF) sensors) to optically measure the distance from the tracking/finder device to the target device, and also the azimuth/elevation relative to the tracking/finder device's reference frame. While this is happening, the tracking/finder device and the target device may be configured to perform radio-based ranging and PDoA/AoA measurements, and then the tracking/finder device may use the information obtained from the camera/lidar to adjust the calibration for the PDoA function $g(\theta, \phi)$. This adjusted PDoA function $g(\theta, \phi)$ may later be used when performing PDoA/AoA measurements against other devices.

In one aspect, assuming that as a user moves the target device in front of the tracking/finder device in which N different measurement for PDoA at N different positions are captured for, the following information may be obtained:

$$\vec{\psi} = [\psi_1, \psi_2, \ldots, \psi_N]^T \quad \vec{\theta} = [\theta_1, \theta_2, \ldots, \theta_N]^T \quad \vec{\phi} = [\phi_1, \phi_2, \ldots, \phi_N]^T \quad (6)$$

where $\vec{\psi}$ is a vector of all the PDoA values, and $\vec{\theta}$ and $\vec{\phi}$ are the vector of azimuths and elevations (relative to a fixed reference frame attached to the body of the tracking/finder device). Now assuming that the true PDoA function $g(\theta, \phi)$ is given by:

$$g(\theta, \phi) = \hat{g}(\theta, \phi) + \epsilon(\theta, \phi) \quad (7)$$

where $\hat{g}(\theta, \phi)$ is the PDoA function obtained via a golden bin process (e.g., an average PDoA function for a representative sample of tracking/finder devices) and $\epsilon(\theta, \phi)$ is the device-specific difference between the true PDoA function and the golden bin PDoA.

In one example, the goal is to estimate $\epsilon(\theta, \phi)$ using the vector of measurements $\vec{\psi}$, $\vec{\theta}$, and $\vec{\phi}$. Given that $(\theta, \phi)$ are coordinates in a spherical coordinate system, the following assumptions may be used to constraint the mathematical problem:

$\epsilon(\theta, \phi)$ is $2\pi$-periodic on $\theta$, that is $\epsilon(\theta, \phi) = \epsilon(\theta + 2\pi, \phi)$.

$\epsilon(\theta, \phi)$ is constant for $\phi = 0$, that is $\epsilon(\theta_1, 0) = \epsilon(\theta_2, 0)$.

$\epsilon(\theta, \phi)$ is constant for $\phi = \pi$, that is $\epsilon(\theta_1, \pi) = \epsilon(\theta_2, \pi)$.

$\epsilon(\theta, \phi)$ is small, that is the true $g(\theta, \phi)$ is close to the golden bin $\hat{g}(\theta, \phi)$.

As an illustration, the following model may be used for:

$$\epsilon(\theta, \phi) = (\alpha_1 + \alpha_2 \cdot \phi) + \sin(\phi) \cdot (\beta_1 \cdot \cos(\theta) + \quad (8)$$
$$\gamma_1 \cdot \sin(\theta) + \beta_2 \cdot \cos(2\theta) + \gamma_2 \cdot \sin(2\theta))$$

The above model may meet the specifications listed above (there may also be more complex models that may meet the specifications with additional degrees of freedom). The goal now is to estimate the $\{\alpha_1, \alpha_2, \beta_1, \beta_2, \gamma_1, \gamma_2\}$ that fit the measurements, where each of the measurements may be used to create an equation:

$$\psi_i = \hat{g}(\theta_i, \phi_i) + \epsilon(\theta_i, \phi_i) \rightarrow \epsilon(\theta_i, \phi_i) = \psi_i - \hat{g}(\theta_i, \phi_i) \quad (9)$$

then formulating in terms of the parameters $\{\alpha_1, \alpha_2, \beta_1, \beta_2, \gamma_1, \gamma_2\}$:

$$(\alpha_1 + \alpha_2 \cdot \phi_i) + \sin(\phi_i) \cdot (\beta_1 \cdot \cos(\theta_i) + \gamma_1 \cdot \sin(\theta_i) + \quad (10)$$
$$\beta_2 \cdot \cos(2\theta_i) + \gamma_2 \cdot \sin(2\theta_i)) = \psi_i - \hat{g}(\theta_i, \phi_i)$$

Now the following shorthand symbols may be defined: $c_{ik} = \cos(k \cdot \theta_i)$, $s_{ik} = \sin(k \cdot \theta_i)$:

$$[1, \phi_1, \sin(\phi_i) \cdot c_{i1}, \sin(\phi_i) \cdot s_{i1}, \sin(\phi_i) \cdot c_{i2}, \sin(\phi_i) \cdot s_{i2}] \cdot \quad (11)$$
$$[\alpha_1, \alpha_2, \beta_1, \beta_2, \gamma_1, \gamma_2]^T = \psi_i - \hat{g}(\theta_i, \phi_i)$$

This may now be put in a matrix form for all entries $i \in \{1, \ldots, N\}$:

$$\begin{bmatrix} 1 & \phi_1 & \sin(\phi_1) \cdot c_{11} & \sin(\phi_1) \cdot s_{11} & \sin(\phi_1) \cdot c_{12} & \sin(\phi_1) \cdot s_{12} \\ 1 & \phi_2 & \sin(\phi_1) \cdot c_{21} & \sin(\phi_1) \cdot s_{21} & \sin(\phi_1) \cdot c_{22} & \sin(\phi_1) \cdot s_{22} \\ \vdots & \vdots & \vdots & \vdots & \vdots & \vdots \\ 1 & \phi_N & \sin(\phi_1) \cdot c_{N1} & \sin(\phi_1) \cdot s_{N1} & \sin(\phi_1) \cdot c_{N2} & \sin(\phi_1) \cdot s_{N2} \end{bmatrix} \cdot \quad (12)$$

$$\begin{bmatrix} \alpha_1 \\ \alpha_2 \\ \beta_1 \\ \beta_2 \\ \gamma_1 \\ \gamma_2 \end{bmatrix} = \begin{bmatrix} \psi_1 - \hat{g}(\theta_1, \phi_1) \\ \psi_2 - \hat{g}(\theta_2, \phi_2) \\ \vdots \\ \psi_N - \hat{g}(\theta_N, \phi_N) \end{bmatrix}$$

The above linear system of equations may be expressed as $A \cdot \vec{x} = \vec{b}$. Assuming that A is a full rank, then the solution may be found using:

$$\vec{x} = (A^T A)^{-1} A^T \cdot \vec{b} \quad (13)$$

After there is $\vec{x} = [\alpha_1, \alpha_2, \beta_1, \beta_2, \gamma_1, \gamma_2]^T$, Equation (8) may be used to reconstruct the error function $\epsilon(\theta, \phi)$ and used to get the PDoA function for the individual tracking/finder device:

$$g(\theta, \phi) = \hat{g}(\theta, \phi) + \epsilon(\theta, \phi) \quad (14)$$

Once $g(\theta, \phi)$ is obtained, it may ben be stored in non-volatile memory on the tracking/finder device, for future use next time the user is specified to find another device using AoA.

In other words, the whole process may be summarized below:

1. A representative sample of units for a given tracking/finder device (e.g., a smartphone) is measured, and an average (or "golden bin") PDoA function $\hat{g}(\theta, \phi)$ is obtained.

2. The golden bin $\hat{g}(\theta,\phi)$ is stored in all future tracking/finder devices manufactured based on the same model.

3. At some point, a consumer purchases a specific tracking/finder device. This specific tracking/finder device has a PDoA function that may depart slightly from the golden bin $\hat{g}(\theta,\phi)$ stored on the phone, due to small component-to-component variation.

4. Sometime later (for example, when the user has purchased a new product, such as a pair of earbuds (e.g., a target device)), an application running on the tracking/finder device may be configured to instruct the user to place the target device in front of the phone camera, and to move the target device to different positions in front of the camera.

5. While the user is moving the target device, the tracking/finder device is simultaneously measuring the position of the target device using the camera (getting $(\theta_i, \phi_i)$) and measuring the PDoA (that is $\psi_i$) caused by RF signals coming from the target device.

6. The phone takes the vector of $\theta_i$, $\phi_i$, $\psi_i$ and uses it to estimate the error function $\in(\theta,\phi)$, using the method described in Equations (12) and (13).

7. After $\in(\theta, \phi)$ is obtained, the true PDoA function g($\theta$, $\phi$) for the tracking/finder device is computed using Equation (14) and stored is at least one non-volatile memory on the tracking/finder device.

8. Next time the user is specified to find a lost device, the tracking/finder device may rely on AOA information computed using the true PDoA function g($\theta$, $\phi$) stored in the non-volatile memory.

In some examples, steps 5 to 7 may be repeated multiple times, once for each radio/band/channel that is specified to have its PDoA function calibrated (provided that both the tracking/finder device and the target device support the same set of radios/bands/channels). The resulting g($\theta,\phi$) function may be specific to the tracking/finder device, but may not be specific to the target device used during the field calibration.

In another aspect of the present disclosure, to implement aspects described in connection with FIG. 7, one or more of the following mechanisms may be specified: (1) a mechanism for the devices to authenticate each other, so that they are able to trust the information coming from each other; (2) a mechanism to decide when to start the process for field calibration; (3) a mechanism for the nodes to exchange their capabilities (radios, bands, and/or channels, etc. supported) with each other; (4) a mechanism to agree on which non-calibrated radio is be calibrated next; (5) a mechanism to ensure the process does not run for too long in order to prevent battery drain, etc.

Aspects presented herein may improve the overall performance of wireless tracking and ranging by simplifying the process of calibrating the RF chains of a wireless device, where the wireless device may rely on an automatic calibration process after the wireless device is deployed in the field. For example, after device deployment, a wireless device may optically calculate range and/or UWB range between two devices, and compare the calculated range against the RTT based range to determine the RF chain-based delay between the devices. The RF chain-based delay may be used to correct delays while doing ToF based ranging between the two devices. In one example, calibration results for one radio (e.g., BT) may be used to calibrate for RTT of another radio (e.g., Wi-Fi).

Aspects presented herein may bring significant benefits, such as reducing the factory test time for each device, and making it feasible to use ranging technology in low-cost wireless devices. For example, aspects presented herein may enable wireless devices to have a reduced set of calibrations done at the factory, and to complete their calibration after they have been deployed in the field, using a fully automated mechanism.

FIG. 12 is a flowchart 1200 of wireless communication at a user equipment (UE) (e.g., a first UE). The method may be performed by a UE (e.g., the UE 104, 404; the first device 502, 702; the finder device 902; the apparatus 1404). The method may enable the UE to calibrate its RF sensor(s) using an optical sensor or a calibrated RF sensor.

At 1202, a first UE may estimate a first distance between the first UE and a second UE using at least one of an optical sensor or a calibrated radio-frequency (RF)-based ranging mechanism, such as described in connection with FIG. 7. For example, as shown at 716, the mobile phone (e.g., the first device 702) may use the camera (or lidar) to estimate the distance from the mobile phone to the earbuds (e.g., the second device 704). The estimation of the first distance may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1204, the first UE may estimate a second distance between the first UE and the second UE using a non-calibrated RF-based ranging mechanism, such as described in connection with FIG. 7. For example, as shown at 718, while the mobile phone (e.g., the first device 702) is measuring distance using optical methods (e.g., based on the at least one optical mechanism such as the camera, lidar, etc.) and obtaining the variable $t_{ij}$ (i.e., ToF for optical signals between devices), the mobile phone may also perform wireless ranging against the earbuds (e.g., the second device 704) using one of the non-calibrated radios (e.g., RF radios) to obtain the variable $s_{ij}$ (i.e., measured time-of-flight between devices based on the non-calibrated radio). The estimation of the second distance may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1208, the first UE may compute an offset that indicates a difference between the estimated first distance and the estimated second distance—the offset is associated with the non-calibrated RF-based ranging mechanism between the first UE and the second UE, such as described in connection with FIG. 7. For example, as shown at 720, the mobile phone (e.g., the first device 702) may compute a combined offset for the mobile phone and the earbuds (e.g., a combined offset of the first device 702 and the second device 704) based on: $(\tau_i + \tau_j) = 2(s_{ij} - t_{ij})$ where $\tau_i$ is the delay for the mobile phone (i.e., the first device 702), and $\tau_j$ is the delay for the earbuds (i.e., the second device 704). The computation of the offset may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1210, the first UE may output an indication of the offset that indicates the difference between the estimated first distance and the estimated second distance, such as described in connection with FIG. 7. For example, as shown at 722, after computing the combined offset, the mobile phone (e.g., the first device 702) may store (e.g., output) the computed combined offset associated with the mobile phone and the earbuds (e.g., the second device 704), such that the mobile phone may have access to this information (e.g., to reuse this offset) in the future when the mobile phone is trying to find this specific pair of earbuds. The output of the indication may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

In one example, at 1206, the first UE may obtain dimension information of the second UE, where the computation of the offset is further based on the dimension information of the second UE, such as described in connection with FIG. 7. For example, as shown at 716, the mobile phone may have information related to the physical size (e.g., dimension information) of the earbuds, which may be downloaded from the Internet or a server (e.g., from the manufacturer/ vendor of the earbuds), or wirelessly broadcasted by the earbuds (or the case of the earbuds). Then, the mobile phone (or the application) may compare the apparent distance of the earbuds in the image against its real size in order to estimate the distance the mobile phone and the earbuds. The obtainment of the dimension information may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

In another example, to output the indication of the offset, the first UE may be configured to (1) store the offset, (2) calculate, based on the offset, a combined delay or a group delay between the first UE and the second UE, and/or (3) compensate or calibrate a set of delays between the first UE and the second UE for a subsequent ranging session between the first UE and the second UE that is based on the non-calibrated RF-based ranging mechanism.

In another example, the offset that indicates the difference between the estimated first distance and the estimated second distance may be a time offset or a distance offset.

In another example, to estimate the first distance between the first UE and the second UE using at least one of the optical sensor or the calibrated RF-based ranging mechanism, the first UE may be configured to estimate the first distance between the first UE and the second UE using the optical sensor. In some implementations, the first UE may further be configured to initiate a pairing process between the first UE and the second UE, and display or output a second indication to place the second UE in a field-of-view (FOV) of the optical sensor. In some implementations, the first UE may further be configured to compute a second offset that is associated with a second non-calibrated RF-based ranging mechanism between the first UE and the second UE based on the offset that indicates the difference between the estimated first distance and the estimated second distance. In some implementations, to estimate the first distance between the first UE and the second UE using the optical sensor, the first UE may be configured to capture a set of images of the second UE using at least one camera, determine a parallax for the set of images of the second UE based on tracking a movement of the first UE, and calculate the first distance based on the set of images and the parallax. In some implementations, to estimate the first distance between the first UE and the second UE using the optical sensor, the first UE may be configured to measure a time-of-flight (ToF) of light between the first UE and the second UE using the optical sensor, and calculate the first distance based on the measured ToF of light between the first UE and the second UE.

In another example, to estimate the second distance between the first UE and the second UE using the non-calibrated RF-based ranging mechanism, the first UE may be configured to measure a round-trip-time (RTT) for a set of signals between the first UE and the second UE using the non-calibrated RF-based ranging mechanism, and calculate the second distance based on the measured RTT for the set of signals between the first UE and the second UE.

In another example, to output the indication of the offset includes storing the offset in a table, the first UE may be configured to receive a request to calculate a current distance between the first UE and the second UE based on the non-calibrated RF-based ranging mechanism, retrieve the stored offset from the table, and calculate the current distance based on the stored offset and a set of ranging measurements obtained from the non-calibrated RF-based ranging mechanism.

In another example, the offset corresponds to a round-trip-time (RTT) delay or a set of delays associated with RF chains of the first UE and the second UE.

In another example, the optical sensor includes at least one of a camera or a Light Detection and Ranging (lidar).

In another example, the non-calibrated RF-based ranging mechanism includes at least one of: Bluetooth® channel sounding (BTCS), Wi-Fi®, or Ultra-wideband (UWB).

In another example, the first UE may provide, at a user interface (UI), a guidance for placing the second UE at a designated area or in front of a camera of the first UE. In some implementations, the UI includes a graphical user interface (GUI) that is configured to display the second UE as the second device UE moves.

FIG. 13 is a flowchart 1300 of wireless communication at a user equipment (UE) (e.g., a first UE). The method may be performed by a UE (e.g., the UE 104, 404; the first device 502, 702; the finder device 902; the apparatus 1404). The method may enable the UE to calibrate its RF sensor(s) using an optical sensor or a calibrated RF sensor.

At 1302, a first UE may estimate a first distance between the first UE and a second UE using at least one of an optical sensor or a calibrated RF-based ranging mechanism, such as described in connection with FIG. 7. For example, as shown at 716, the mobile phone (e.g., the first device 702) may use the camera (or lidar) to estimate the distance from the mobile phone to the earbuds (e.g., the second device 704). The estimation of the first distance may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1304, the first UE may estimate a second distance between the first UE and the second UE using a non-calibrated RF-based ranging mechanism, such as described in connection with FIG. 7. For example, as shown at 718, while the mobile phone (e.g., the first device 702) is measuring distance using optical methods (e.g., based on the at least one optical mechanism such as the camera, lidar, etc.) and obtaining the variable $t_{ij}$ (i.e., ToF for optical signals between devices), the mobile phone may also perform wireless ranging against the earbuds (e.g., the second device 704) using one of the non-calibrated radios (e.g., RF radios) to obtain the variable $s_{ij}$ (i.e., measured time-of-flight between devices based on the non-calibrated radio). The estimation of the second distance may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1308, the first UE may compute an offset that indicates a difference between the estimated first distance and the estimated second distance—the offset is associated with the non-calibrated RF-based ranging mechanism between the first UE and the second UE, such as described in connection with FIG. 7. For example, as shown at 720, the mobile phone (e.g., the first device 702) may compute a combined offset for the mobile phone and the earbuds (e.g., a combined offset of the first device 702 and the second device 704) based on: $(\tau_i+\tau_j)=2(s_{ij}-t_{ij})$ where $\tau_i$ is the delay for the mobile phone (i.e., the first device 702), and $\tau_j$ is the delay for the earbuds (i.e., the second device 704). The computation of the offset may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

At 1310, the first UE may output an indication of the offset that indicates the difference between the estimated first distance and the estimated second distance, such as described in connection with FIG. 7. For example, as shown at 722, after computing the combined offset, the mobile phone (e.g., the first device 702) may store (e.g., output) the computed combined offset associated with the mobile phone and the earbuds (e.g., the second device 704), such that the mobile phone may have access to this information (e.g., to reuse this offset) in the future when the mobile phone is trying to find this specific pair of earbuds. The output of the indication may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

In one example, the first UE may obtain dimension information of the second UE, where the computation of the offset is further based on the dimension information of the second UE, such as described in connection with FIG. 7. For example, as shown at 716, the mobile phone may have information related to the real physical size (e.g., dimension information) of the earbuds, which may be downloaded from the Internet or a server (e.g., from the manufacturer/ vendor of the earbuds), or wirelessly broadcasted by the earbuds (or the case of the earbuds). Then, the mobile phone (or the application) may compare the apparent distance of the earbuds in the image against its real size in order to estimate the distance the mobile phone and the earbuds. The obtainment of the dimension information may be performed by, e.g., the calibration component 198, the one or more sensors 1418, the camera 1432, the transceiver(s) 1422, the cellular baseband processor(s) 1424, and/or the application processor(s) 1406 of the apparatus 1404 in FIG. 14.

In another example, to output the indication of the offset, the first UE may be configured to (1) store the offset, (2) calculate, based on the offset, a combined delay or a group delay between the first UE and the second UE, and/or (3) compensate or calibrate a set of delays between the first UE and the second UE for a subsequent ranging session between the first UE and the second UE that is based on the non-calibrated RF-based ranging mechanism.

In another example, the offset that indicates the difference between the estimated first distance and the estimated second distance may be a time offset or a distance offset.

In another example, to estimate the first distance between the first UE and the second UE using at least one of the optical sensor or the calibrated RF-based ranging mechanism, the first UE may be configured to estimate the first distance between the first UE and the second UE using the optical sensor. In some implementations, the first UE may further be configured to initiate a pairing process between the first UE and the second UE, and display or output a second indication to place the second UE in an FOV of the optical sensor. In some implementations, the first UE may further be configured to compute a second offset that is associated with a second non-calibrated RF-based ranging mechanism between the first UE and the second UE based on the offset that indicates the difference between the estimated first distance and the estimated second distance. In some implementations, to estimate the first distance between the first UE and the second UE using the optical sensor, the first UE may be configured to capture a set of images of the second UE using at least one camera, determine a parallax for the set of images of the second UE based on tracking a movement of the first UE, and calculate the first distance based on the set of images and the parallax. In some implementations, to estimate the first distance between the first UE and the second UE using the optical sensor, the first UE may be configured to measure a ToF of light between the first UE and the second UE using the optical sensor, and calculate the first distance based on the measured ToF of light between the first UE and the second UE.

In another example, to estimate the second distance between the first UE and the second UE using the non-calibrated RF-based ranging mechanism, the first UE may be configured to measure an RTT for a set of signals between the first UE and the second UE using the non-calibrated RF-based ranging mechanism, and calculate the second distance based on the measured RTT for the set of signals between the first UE and the second UE.

In another example, to output the indication of the offset includes storing the offset in a table, the first UE may be configured to receive a request to calculate a current distance between the first UE and the second UE based on the non-calibrated RF-based ranging mechanism, retrieve the stored offset from the table, and calculate the current distance based on the stored offset and a set of ranging measurements obtained from the non-calibrated RF-based ranging mechanism.

In another example, the offset corresponds to an RTT delay or a set of delays associated with RF chains of the first UE and the second UE.

In another example, the optical sensor includes at least one of a camera or a lidar.

In another example, the non-calibrated RF-based ranging mechanism includes at least one of: BTCS, Wi-Fi®, or UWB.

In another example, the first UE may provide, at an UI, a guidance for placing the second UE at a designated area or in front of a camera of the first UE. In some implementations, the UI includes a GUI that is configured to display the second UE as the second device UE moves.

Figure 14:
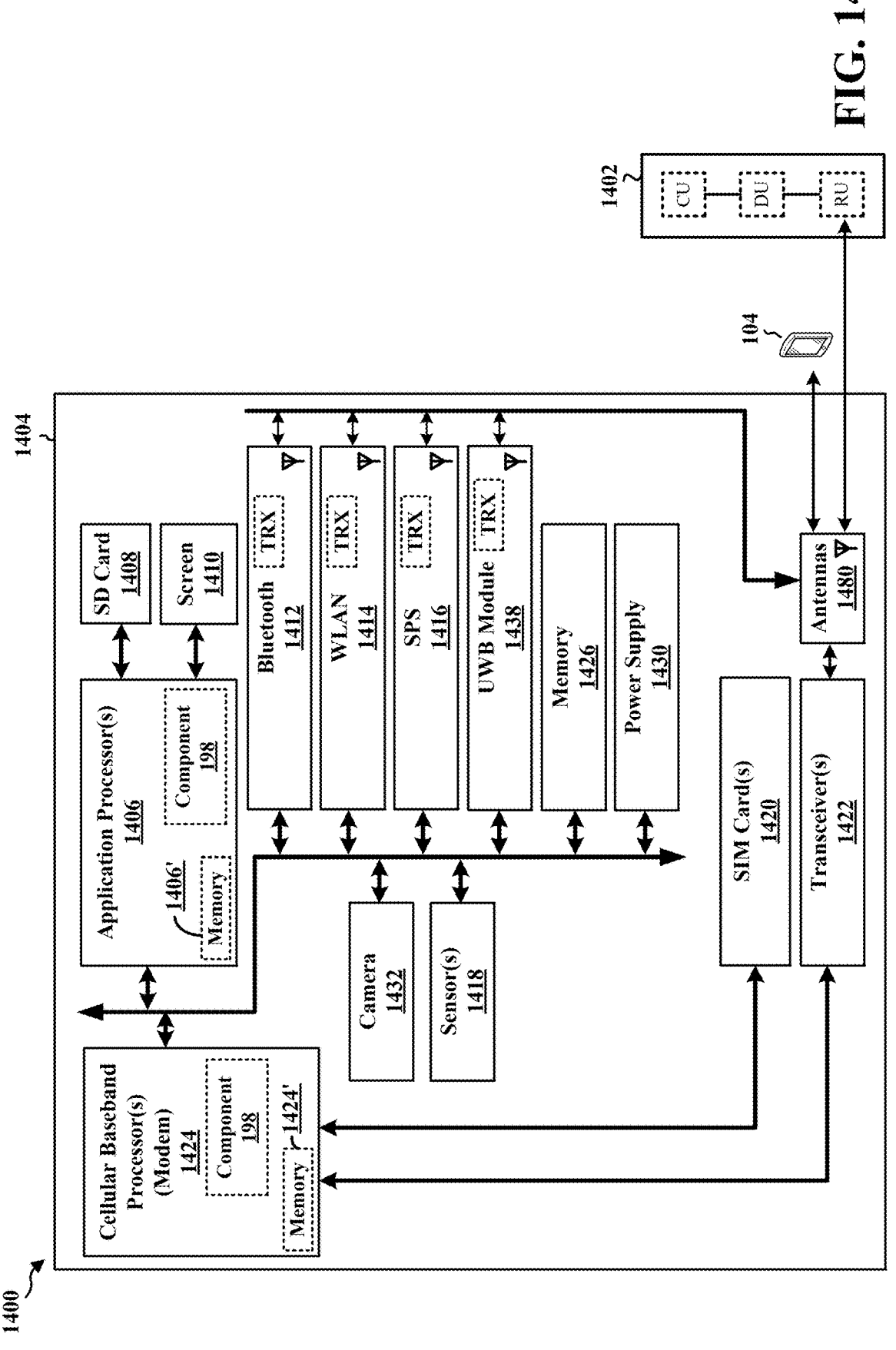
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE (e.g., a first UE), a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an ultrawide band (UWB)

module 1438 (e.g., a UWB transceiver), an SPS module 1416 (e.g., GNSS module), one or more sensors 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the UWB module 1438, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/ memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the calibration component 198 may be configured to estimate a first distance between the first UE and a second UE using at least one of an optical sensor or a calibrated RF-based ranging mechanism. The calibration component 198 may also be configured to estimate a second distance between the first UE and the second UE using a non-calibrated RF-based ranging mechanism. The calibration component 198 may also be configured to compute an offset that indicates a difference between the estimated first distance and the estimated second distance, where the offset is associated with the non-calibrated RF-based ranging mechanism between the first UE and the second UE. The calibration component 198 may also be configured to output an indication of the offset that indicates the difference between the estimated first distance and the estimated second distance. The calibration component 198 may be within the cellular baseband processor(s) 1424, the application processor(s) 1406, or both the cellular baseband processor(s) 1424 and the application processor(s) 1406. The calibration component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for estimating a first distance between the first UE and a second UE using at least one of an optical sensor or a calibrated RF-based ranging mechanism. The apparatus 1404 may further include means for estimating a second distance between the first UE and the second UE using a non-calibrated RF-based ranging mechanism. The apparatus 1404 may further include means for computing an offset that indicates a difference between the estimated first distance and the estimated second distance, where the offset is associated with the non-calibrated RF-based ranging mechanism between the first UE and the second UE. The apparatus 1404 may further include means for outputting an indication of the offset that indicates the difference between the estimated first distance and the estimated second distance.

In one configuration, the apparatus 1404 may further include means for obtaining dimension information of the second UE, where the computation of the offset is further based on the dimension information of the second UE.

In another configuration, the means for outputting the indication of the offset may include configuring the apparatus 1404 to (1) store the offset, (2) calculate, based on the offset, a combined delay or a group delay between the first UE and the second UE, and/or (3) compensate or calibrate a set of delays between the first UE and the second UE for a subsequent ranging session between the first UE and the second UE that is based on the non-calibrated RF-based ranging mechanism.

In another configuration, the offset that indicates the difference between the estimated first distance and the estimated second distance may be a time offset or a distance offset.

In another configuration, the means for estimating the first distance between the first UE and the second UE using at least one of the optical sensor or the calibrated RF-based ranging mechanism may include configuring the apparatus 1404 to estimate the first distance between the first UE and the second UE using the optical sensor. In some implementations, the apparatus 1404 may further include means for initiating a pairing process between the first UE and the second UE, and display or output a second indication to place the second UE in an FOV of the optical sensor. In some implementations, the apparatus 1404 may further include means for computing a second offset that is associated with a second non-calibrated RF-based ranging mechanism between the first UE and the second UE based on the offset that indicates the difference between the estimated first distance and the estimated second distance. In some implementations, the means for estimating the first distance between the first UE and the second UE using the optical sensor may include configuring the apparatus 1404 to capture a set of images of the second UE using at least one camera, determine a parallax for the set of images of the second UE based on tracking a movement of the first UE, and calculate the first distance based on the set of images and the parallax. In some implementations, the means for estimating the first distance between the first UE and the second UE using the optical sensor may include configuring the apparatus 1404 to measure a ToF of light between the first UE and the second UE using the optical sensor, and calculate the first distance based on the measured ToF of light between the first UE and the second UE.

In another configuration, the means for estimating the second distance between the first UE and the second UE using the non-calibrated RF-based ranging mechanism may include configuring the apparatus 1404 to measure an RTT for a set of signals between the first UE and the second UE using the non-calibrated RF-based ranging mechanism, and calculate the second distance based on the measured RTT for the set of signals between the first UE and the second UE.

In another configuration, the means for outputting the indication of the offset includes the means for storing the offset in a table, the apparatus 1404 may further include means for receiving a request to calculate a current distance between the first UE and the second UE based on the non-calibrated RF-based ranging mechanism, means for retrieving the stored offset from the table, and means for calculating the current distance based on the stored offset and a set of ranging measurements obtained from the non-calibrated RF-based ranging mechanism.

In another configuration, the offset corresponds to an RTT delay or a set of delays associated with RF chains of the first UE and the second UE.

In another configuration, the optical sensor includes at least one of a camera or a lidar.

In another configuration, the non-calibrated RF-based ranging mechanism includes at least one of: BTCS, Wi-Fi®, or UWB.

In another configuration, the apparatus 1404 may further include means for providing, at an UI, a guidance for placing the second UE at a designated area or in front of a camera of the first UE. In some implementations, the UI includes a GUI that is configured to display the second UE as the second device UE moves.

The means may be the calibration component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. A processor may be referred to as processor circuitry. A memory/memory module may be referred to as memory circuitry. If a first apparatus receives data from or transmits data to a second apparatus, the data may be received/transmitted directly between the first and second apparatuses, or indirectly between the first and second apparatuses through a set of apparatuses. A device configured to "output" data or "provide" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first user equipment (UE), comprising: estimating a first distance between the first UE and a second UE using at least one of an optical sensor or a calibrated radio-frequency (RF)-based ranging mechanism; estimating a second distance between the first UE and the second UE using a non-calibrated RF-based ranging mechanism; computing an offset that indicates a difference between the estimated first distance and the estimated second distance, wherein the offset is associated with the non-calibrated RF-based ranging mechanism between the first UE and the second UE; and outputting an indication of the offset that indicates the difference between the estimated first distance and the estimated second distance.

Aspect 2 is the method of aspect 1, wherein outputting the indication of the offset comprises at least one of: storing the offset, calculating, based on the offset, a combined delay or a group delay between the first UE and the second UE, or compensating or calibrating a set of delays between the first UE and the second UE for a subsequent ranging session between the first UE and the second UE that is based on the non-calibrated RF-based ranging mechanism.

Aspect 3 is the method of aspect 1 or aspect 2, wherein the offset that indicates the difference between the estimated first distance and the estimated second distance is a time offset or a distance offset.

Aspect 4 is the method of any of aspects 1 to 3, further comprising: obtaining dimension information of the second UE, wherein the computation of the offset is further based on the dimension information of the second UE.

Aspect 5 is the method of any of aspects 1 to 4, wherein estimating the first distance between the first UE and the second UE using at least one of the optical sensor or the calibrated RF-based ranging mechanism comprises: estimating the first distance between the first UE and the second UE using the optical sensor.

Aspect 6 is the method of any of aspects 1 to 5, further comprising: initiating a pairing process between the first UE and the second UE; and displaying or outputting a second indication to place the second UE in a field-of-view (FOV) of the optical sensor.

Aspect 7 is the method of any of aspects 1 to 6, further comprising: computing a second offset that is associated with a second non-calibrated RF-based ranging mechanism between the first UE and the second UE based on the offset that indicates the difference between the estimated first distance and the estimated second distance.

Aspect 8 is the method of any of aspects 1 to 7, wherein estimating the first distance between the first UE and the second UE using the optical sensor comprises: capturing a set of images of the second UE using at least one camera; determining a parallax for the set of images of the second UE based on tracking a movement of the first UE; and calculating the first distance based on the set of images and the parallax.

Aspect 9 is the method of any of aspects 1 to 8, wherein estimating the first distance between the first UE and the second UE using the optical sensor comprises: measuring a time-of-flight (ToF) of light between the first UE and the second UE using the optical sensor; and calculating the first distance based on the measured ToF of light between the first UE and the second UE.

Aspect 10 is the method of any of aspects 1 to 9, wherein estimating the second distance between the first UE and the second UE using the non-calibrated RF-based ranging mechanism comprises: measuring a round-trip-time (RTT) for a set of signals between the first UE and the second UE using the non-calibrated RF-based ranging mechanism; and calculating the second distance based on the measured RTT for the set of signals between the first UE and the second UE.

Aspect 11 is the method of any of aspects 1 to 10, wherein outputting the indication of the offset comprises storing the offset in a table, the method further comprising: receiving a request to calculate a current distance between the first UE and the second UE based on the non-calibrated RF-based ranging mechanism; retrieving the stored offset from the table; and calculating the current distance based on the stored offset and a set of ranging measurements obtained from the non-calibrated RF-based ranging mechanism.

Aspect 12 is the method of any of aspects 1 to 11, wherein the offset corresponds to a round-trip-time (RTT) delay or a set of delays associated with RF chains of the first UE and the second UE.

Aspect 13 is the method of any of aspects 1 to 12, further comprising at least one transceiver coupled to the at least one processor, wherein to output the indication of the offset, the at least one processor, individually or in any combination, is configured to transmit the indication of the offset via the at least one transceiver, wherein the optical sensor includes at least one of a camera or a Light Detection and Ranging (lidar).

Aspect 14 is the method of any of aspects 1 to 13, wherein the non-calibrated RF-based ranging mechanism includes at least one of: Bluetooth® channel sounding (BTCS), Wi-Fi®, or Ultra-wideband (UWB).

Aspect 15 is the method of any of aspects 1 to 14, further comprising: providing, at a user interface (UI), a guidance for placing the second UE at a designated area or in front of a camera of the first UE.

Aspect 16 is the method of any of aspects 1 to 15, wherein the UI includes a graphical user interface (GUI) that is configured to display the second UE as the second device UE moves.

Aspect 17 is an apparatus for wireless communication at a first user equipment (UE), including: at least one memory; and at least one processor coupled to the at least one memory and, based at least in part on stored information that is stored in the at least one memory, the at least one processor, individually or in any combination, is configured to implement any of aspects 1 to 16.

Aspect 18 is the apparatus of aspect 17, further including at least one transceiver coupled to the at least one processor.

Aspect 19 is an apparatus for wireless communication at a first user equipment (UE) including means for implementing any of aspects 1 to 16.

Aspect 20 is a computer-readable medium (e.g., a non-transitory computer-readable medium) storing computer executable code, where the code when executed by a processor causes the processor to implement any of aspects 1 to 16.

Aspect 21 is a method of wireless communication at a first user equipment (UE), comprising: estimating, using an optical sensor, a set of relative directions of a second UE compared to the first UE at multiple positions of the first UE;

obtaining, using a radio frequency (RF) sensor, a set of phase difference of arrivals (PDoA) or angle-of-arrivals (AoA) measurements associated with the second UE via the multiple positions of the first UE; adjusting a PDoA function related to the first UE based on the set of relative directions of the second UE and the set of PDoA or AoA measurements; and outputting an indication of the adjusted PDoA function.

Aspect 22 is the method of aspect 21, wherein the PDoA function is a function $g(\theta,\phi)$ that calculates an ideal or hypothetical PDoA value for a signal from a direction with an azimuth angle ($\theta$) and an elevation angle ($\phi$).

Aspect 23 is the method of aspect 21 or aspect 22, wherein outputting the indication of the adjusted PDoA function comprises storing the adjusted PDoA function, or estimating, based on the adjusted PDoA, a relative direction of the second UE or a third UE compared to the first UE.

Aspect 24 is the method of any of aspects 21 to 23, further comprising: outputting a second indication of the estimated relative direction of the second UE or the third UE compared to the first UE.

Aspect 25 is the method of any of aspects 21 to 24, wherein outputting the second indication of the estimated relative direction of the second UE or the third UE compared to the first UE comprises transmitting, via at least one of the transceiver or the antenna, the second indication of the estimated relative direction of the second UE or the third UE compared to the first UE, displaying the second indication via a screen or a user interface (UI), or storing the second indication of the estimated relative direction of the second UE or the third UE compared to the first UE.

Aspect 26 is the method of any of aspects 21 to 25, further comprising: obtaining distance information between the first UE and the second UE or between the first UE and the third UE; and computing, based on the distance information and the relative direction of the second UE or the third UE, a relative location of the second UE or the third UE with respect to the first UE.

Aspect 27 is the method of any of aspects 21 to 26, further comprising: obtaining a second indication of the PDoA function related to the first UE.

Aspect 28 is the method of any of aspects 21 to 27, wherein to obtain the second indication of the PDoA function related to the first UE, the at least one processor, individually or in any combination, is configured to at least one of: obtain the second indication of the PDoA function via a calibration process, obtain the second indication based on a lookup table (LUT), receive the second indication from another device or a network entity, or obtain the second indication based on a pre-configuration.

Aspect 29 is the method of any of aspects 21 to 28, wherein each relative direction in the set of relative directions corresponds to a PDoA or AoA measurement in the set of PDoA or AoA measurements at one of the multiple positions of the first UE.

Aspect 30 is an apparatus for wireless communication at a first user equipment (UE), including: at least one memory; and at least one processor coupled to the at least one memory and, based at least in part on stored information that is stored in the at least one memory, the at least one processor, individually or in any combination, is configured to implement any of aspects 21 to 29.

Aspect 31 is the apparatus of aspect 29, further including at least one transceiver coupled to the at least one processor.

Aspect 32 is an apparatus for wireless communication at a first user equipment (UE) including means for implementing any of aspects 21 to 29.

Aspect 33 is a computer-readable medium (e.g., a non-transitory computer-readable medium) storing computer executable code, where the code when executed by a processor causes the processor to implement any of aspects 21 to 29.

What is claimed is:

1. An apparatus for wireless communication at a first user equipment (UE), comprising:
at least one memory; and
at least one processor coupled to the at least one memory, the at least one processor, individually or in any combination, is configured to:
estimate a first distance between the first UE and a second UE using at least one of an optical sensor or a calibrated radio-frequency (RF)-based ranging mechanism;
estimate a second distance between the first UE and the second UE using a non-calibrated RF-based ranging mechanism;
compute an offset that indicates a difference between the estimated first distance and the estimated second distance, wherein the offset is associated with the non-calibrated RF-based ranging mechanism between the first UE and the second UE; and
output an indication of the offset that indicates the difference between the estimated first distance and the estimated second distance.

2. The apparatus of claim 1, wherein to output the indication of the offset comprises, the at least one processor, individually or in any combination, is configured to at least one of:
store the offset,
calculate, based on the offset, a combined delay or a group delay between the first UE and the second UE, or
compensate or calibrate a set of delays between the first UE and the second UE for a subsequent ranging session between the first UE and the second UE that is based on the non-calibrated RF-based ranging mechanism.

3. The apparatus of claim 1, wherein the offset that indicates the difference between the estimated first distance and the estimated second distance is a time offset or a distance offset.

4. The apparatus of claim 1, wherein the at least one processor, individually or in any combination, is further configured to:
obtain dimension information of the second UE, wherein the computation of the offset is further based on the dimension information of the second UE.

5. The apparatus of claim 1, wherein to estimate the first distance between the first UE and the second UE using at least one of the optical sensor or the calibrated RF-based ranging mechanism, the at least one processor, individually or in any combination, is configured to:
estimate the first distance between the first UE and the second UE using the optical sensor.

6. The apparatus of claim 5, wherein the at least one processor, individually or in any combination, is further configured to:
initiate a pairing process between the first UE and the second UE; and
display or outputting a second indication to place the second UE in a field-of-view (FOV) of the optical sensor.

7. The apparatus of claim 5, wherein the at least one processor, individually or in any combination, is further configured to:

compute a second offset that is associated with a second non-calibrated RF-based ranging mechanism between the first UE and the second UE based on the offset that indicates the difference between the estimated first distance and the estimated second distance.

8. The apparatus of claim 5, wherein to estimate the first distance between the first UE and the second UE using the optical sensor, the at least one processor, individually or in any combination, is configured to:

capture a set of images of the second UE using at least one camera;

determine a parallax for the set of images of the second UE based on tracking a movement of the first UE; and calculate the first distance based on the set of images and the parallax.

9. The apparatus of claim 5, wherein to estimate the first distance between the first UE and the second UE using the optical sensor, the at least one processor, individually or in any combination, is configured to:

measure a time-of-flight (ToF) of light between the first UE and the second UE using the optical sensor; and calculate the first distance based on the measured ToF of light between the first UE and the second UE.

10. The apparatus of claim 1, wherein to estimate the second distance between the first UE and the second UE using the non-calibrated RF-based ranging mechanism, the at least one processor, individually or in any combination, is configured to:

measure a round-trip-time (RTT) for a set of signals between the first UE and the second UE using the non-calibrated RF-based ranging mechanism; and calculate the second distance based on the measured RTT for the set of signals between the first UE and the second UE.

11. The apparatus of claim 1, wherein to output the indication of the offset the at least one processor, individually or in any combination, is configured to store the offset in a table, wherein the at least one processor, individually or in any combination, is further configured to:

receive a request to calculate a current distance between the first UE and the second UE based on the non-calibrated RF-based ranging mechanism;

retrieve the stored offset from the table; and calculate the current distance based on the stored offset and a set of ranging measurements obtained from the non-calibrated RF-based ranging mechanism.

12. The apparatus of claim 1, wherein the offset corresponds to a round-trip-time (RTT) delay or a set of delays associated with RF chains of the first UE and the second UE.

13. The apparatus of claim 1, further comprising at least one transceiver coupled to the at least one processor, wherein to output the indication of the offset, the at least one processor, individually or in any combination, is configured to transmit the indication of the offset via the at least one transceiver, wherein the optical sensor includes at least one of a camera or a Light Detection and Ranging (lidar).

14. The apparatus of claim 1, further comprising a user interface (UI), wherein the at least one processor, individually or in any combination, is further configured to:

provide, at the UI, a guidance for placing the second UE at a designated area or in front of a camera of the first UE.

15. A method of wireless communication at a first user equipment (UE), comprising:

estimating a first distance between the first UE and a second UE using at least one of an optical sensor or a calibrated radio-frequency (RF)-based ranging mechanism;

estimating a second distance between the first UE and the second UE using a non-calibrated RF-based ranging mechanism;

computing an offset that indicates a difference between the estimated first distance and the estimated second distance, wherein the offset is associated with the non-calibrated RF-based ranging mechanism between the first UE and the second UE; and outputting an indication of the offset that indicates the difference between the estimated first distance and the estimated second distance.

16. The method of claim 15, wherein outputting the indication of the offset comprises at least one of:

storing the offset, calculating, based on the offset, a combined delay or a group delay between the first UE and the second UE, or compensating or calibrating a set of delays between the first UE and the second UE for a subsequent ranging session between the first UE and the second UE that is based on the non-calibrated RF-based ranging mechanism.

17. The method of claim 15, further comprising:

obtaining dimension information of the second UE, wherein the computation of the offset is further based on the dimension information of the second UE.

18. The method of claim 15, wherein estimating the first distance between the first UE and the second UE using at least one of the optical sensor or the calibrated RF-based ranging mechanism comprises:

estimating the first distance between the first UE and the second UE using the optical sensor.

19. The method of claim 15, wherein estimating the second distance between the first UE and the second UE using the non-calibrated RF-based ranging mechanism comprises:

measuring a round-trip-time (RTT) for a set of signals between the first UE and the second UE using the non-calibrated RF-based ranging mechanism; and calculating the second distance based on the measured RTT for the set of signals between the first UE and the second UE.

20. An apparatus for wireless communication at a first user equipment (UE), comprising:

a user interface (UI);

at least one memory; and at least one processor coupled to the at least one memory, the at least one processor, individually or in any combination, is configured to:

provide, at the UI, a guidance for placing a second UE at a designated area or in front of a camera of the first UE;

estimate a first distance between the first UE and the second UE using at least one of an optical sensor or a calibrated radio-frequency (RF)-based ranging mechanism;

estimate a second distance between the first UE and the second UE using a non-calibrated RF-based ranging mechanism;

compute an offset that indicates a difference between the estimated first distance and the estimated second distance, wherein the offset is associated with the non-calibrated RF-based ranging mechanism between the first UE and the second UE; and output an indication of the offset that indicates the difference between the estimated first distance and the estimated second distance.

\*  \*  \*  \*  \*